US012219407B1

United States Patent
Mahoney et al.

(10) Patent No.: US 12,219,407 B1
(45) Date of Patent: *Feb. 4, 2025

(54) CONTINUOUS WIRELESS COMMUNICATION SYSTEMS AND ASSOCIATED METHODS

(71) Applicant: Cable Television Laboratories, Inc., Louisville, CO (US)

(72) Inventors: Kevin E. Mahoney, Longmont, CO (US); Stephen Glennon, Lafayette, CO (US); Stephen Arendt, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,914

(22) Filed: Jun. 12, 2023

Related U.S. Application Data

(63) Continuation of application No. 17/151,284, filed on Jan. 18, 2021, now Pat. No. 11,678,232, which is a continuation of application No. 16/425,575, filed on May 29, 2019, now Pat. No. 10,897,727.

(60) Provisional application No. 62/701,970, filed on Jul. 23, 2018, provisional application No. 62/678,104, filed on May 30, 2018, provisional application No. 62/677,423, filed on May 29, 2018.

(51) Int. Cl.
*H04W 36/30* (2009.01)
*H04W 36/00* (2009.01)
*H04W 84/12* (2009.01)

(52) U.S. Cl.
CPC ....... *H04W 36/0055* (2013.01); *H04W 36/30* (2013.01); *H04W 84/12* (2013.01)

(58) Field of Classification Search
CPC .. H04W 36/0055; H04W 36/30; H04W 84/12
See application file for complete search history.

(56) References Cited

U.S. PATENT DOCUMENTS

| | | | |
|---|---|---|---|
| 8,270,409 B2 * | 9/2012 | Hancock | H04L 12/66 370/395.2 |
| 9,015,331 B2 | 4/2015 | Lai et al. | |
| 9,025,514 B2 * | 5/2015 | Hancock | H04W 48/18 455/436 |

(Continued)

FOREIGN PATENT DOCUMENTS

| | | |
|---|---|---|
| EP | 3113541 A1 | 1/2017 |
| EP | 3236692 A1 | 10/2017 |
| WO | 2015105985 A1 | 7/2015 |

OTHER PUBLICATIONS

Control and Provisioning of Wireless Access Points (CAPWAP) Protocol Binding for IEEE 802.11 (RFC5416); Mar. 1, 2009.

*Primary Examiner* — Jay P Patel
(74) *Attorney, Agent, or Firm* — PdZ Patent Law, PLLC

(57) ABSTRACT

A method for providing continuous wireless communication service includes (a) transmitting a first UniCast beacon from a first wireless termination point (WTP) to a first user equipment (UE) station, (b) after transmitting the first UniCast beacon to the first UE station, handing off the first UE station from the first WTP to a second WTP, and (c) transmitting a second UniCast beacon from the second WTP to the first UE station, each of the first and second UniCast beacons including a common first basic service set identifier (BSSID).

20 Claims, 16 Drawing Sheets

(56) References Cited

U.S. PATENT DOCUMENTS

| | | | |
|---|---|---|---|
| 9,807,691 B2 | 10/2017 | Jia et al. | |
| 10,244,446 B2 | 3/2019 | Zhang | |
| 10,433,230 B2 | 10/2019 | Gao et al. | |
| 10,667,195 B2 | 5/2020 | Gao et al. | |
| 11,317,058 B2 | 4/2022 | Deschenes et al. | |
| 2005/0074015 A1 | 4/2005 | Chari et al. | |
| 2005/0128988 A1* | 6/2005 | Simpson | H04W 48/16 370/338 |
| 2007/0019573 A1 | 1/2007 | Nishimura | |
| 2010/0014483 A1* | 1/2010 | Hancock | H04L 12/66 370/331 |
| 2013/0064222 A1* | 3/2013 | Hancock | H04W 48/18 370/331 |
| 2013/0301551 A1 | 11/2013 | Ghosh et al. | |
| 2014/0003282 A1* | 1/2014 | Kafle | H04W 48/14 370/254 |
| 2014/0003331 A1* | 1/2014 | Klein | H04B 3/50 370/328 |
| 2014/0064261 A1* | 3/2014 | Wang | H04W 40/02 370/338 |
| 2014/0092742 A1 | 4/2014 | Chou | |
| 2014/0119358 A1 | 5/2014 | Xu | |
| 2014/0241226 A1 | 8/2014 | Jia et al. | |
| 2015/0180676 A1 | 6/2015 | Bao et al. | |
| 2015/0350974 A1 | 12/2015 | Patil et al. | |
| 2016/0081019 A1 | 3/2016 | Pujari et al. | |
| 2016/0157266 A1* | 6/2016 | Wang | H04W 72/23 370/336 |
| 2016/0198424 A1 | 7/2016 | Luo et al. | |
| 2016/0212635 A1* | 7/2016 | Cho | H04W 92/20 |
| 2016/0227489 A1* | 8/2016 | Oteri | H04W 52/243 |
| 2016/0234720 A1 | 8/2016 | Barany et al. | |
| 2016/0249293 A1 | 8/2016 | Lee | |
| 2016/0330077 A1* | 11/2016 | Jin | H04L 41/0895 |
| 2017/0006494 A1 | 1/2017 | Wang et al. | |
| 2017/0135015 A1 | 5/2017 | Yang et al. | |
| 2017/0289990 A1* | 10/2017 | Kaushik | H04L 12/4625 |
| 2017/0311218 A1 | 10/2017 | Zhang | |
| 2017/0317726 A1 | 11/2017 | Abdallah | |
| 2017/0332286 A1 | 11/2017 | Lepp et al. | |
| 2017/0373725 A1 | 12/2017 | Lee et al. | |
| 2017/0374517 A1 | 12/2017 | Davydov et al. | |
| 2018/0027490 A1 | 1/2018 | Liu et al. | |
| 2018/0048450 A1 | 2/2018 | Raissinia et al. | |
| 2018/0077572 A1 | 3/2018 | Trappitt | |
| 2018/0084484 A1 | 3/2018 | Hariharan | |
| 2018/0084485 A1 | 3/2018 | Hariharan | |
| 2018/0192428 A1 | 7/2018 | Doostnejad et al. | |
| 2018/0234886 A1* | 8/2018 | Bhorkar | H04W 28/18 |
| 2018/0255480 A1 | 9/2018 | Yang et al. | |
| 2018/0279209 A1 | 9/2018 | Fang et al. | |
| 2018/0338321 A1 | 11/2018 | Shepard et al. | |
| 2019/0116173 A1 | 4/2019 | Robison et al. | |
| 2019/0150093 A1* | 5/2019 | Kweon | H04W 76/30 370/311 |
| 2019/0182740 A1 | 6/2019 | Gao et al. | |
| 2019/0297553 A1 | 9/2019 | Wang et al. | |
| 2019/0306790 A1* | 10/2019 | Kottontavida | H04W 72/52 |
| 2019/0349831 A1 | 11/2019 | Gao et al. | |
| 2020/0029357 A1 | 1/2020 | Shepard et al. | |
| 2020/0092069 A1 | 3/2020 | Glennon et al. | |
| 2020/0196241 A1* | 6/2020 | Lou | H04W 52/0229 |
| 2020/0314027 A1 | 10/2020 | Deschenes et al. | |
| 2020/0344695 A1* | 10/2020 | Wang | H04W 52/0219 |
| 2023/0410003 A1* | 12/2023 | Haynes, III | G06F 40/40 |

* cited by examiner

| SST 1 | |
|---|---|
| UE Station | RSSI |
| 110(1) | 9 |
| 110(2) | 6 |

FIG. 8

| SST 2 | |
|---|---|
| UE Station | RSSI |
| 110(1) | 5 |
| 110(2) | 7 |

FIG. 9

| SST 3 | |
|---|---|
| UE Station | RSSI |
| 110(1) | 2 |
| 110(2) | 3 |

```
┌─────────────────────────────────────────────────────────────────────┐
│   Transmit a First UniCast Beacon From a First WTP to a First UE Station │
│                              1302                                   │
└─────────────────────────────────────────────────────────────────────┘
                                  │
                                  ▼
┌─────────────────────────────────────────────────────────────────────┐
│ After Transmitting the First UniCast Beacon to the First UE Station, Hand-Off the │
│         First UE Station from the First WTP to a Second WTP         │
│                              1304                                   │
└─────────────────────────────────────────────────────────────────────┘
                                  │
                                  ▼
┌─────────────────────────────────────────────────────────────────────┐
│   Transmit a Second UniCast Beacon From the Second WTP to the First UE │
│  Station, Each of the First and Second UniCast Beacons Including a Common │
│                            First BSSID                              │
│                              1306                                   │
└─────────────────────────────────────────────────────────────────────┘
```

FIG. 13

CONTINUOUS WIRELESS COMMUNICATION SYSTEMS AND ASSOCIATED METHODS

RELATED APPLICATIONS

This application is a continuation of U.S. patent application Ser. No. 17/151,284, filed on Jan. 18, 2021, which is a continuation of U.S. patent application Ser. No. 16/425,575, filed on May 29, 2019, now U.S. Pat. No. 10,897,727, which claims benefit of priority to (a) U.S. Provisional Patent Application Ser. No. 62/677,423, filed on May 29, 2018, (b) U.S. Provisional Patent Application Ser. No. 62/678,104, filed on May 30, 2018, and (c) U.S. Provisional Patent Application Ser. No. 62/701,970, filed on Jul. 23, 2018. Each of the aforementioned patent applications is incorporated herein by reference.

BACKGROUND

Wireless communication systems may use licensed radio frequency (RF) spectrum, unlicensed RF spectrum, or a combination of licensed and unlicensed RF spectrum. Cellular wireless communication systems primarily use licensed RF spectrum, while Wi-Fi wireless communication systems use unlicensed RF spectrum. Wi-Fi wireless communication systems have become very popular, partly due to the relatively low-cost and wide-availability of Wi-Fi hardware.

BRIEF DESCRIPTION OF THE DRAWINGS

FIG. 8-10 illustrative respective hypothetical examples of signal strength tables.

FIG. 13 is a flow chart illustrating a method for providing continuous wireless communication service, according to an embodiment.

DETAILED DESCRIPTION OF THE EMBODIMENTS

While Wi-Fi wireless communication systems benefit from low-cost and widely-available hardware, Wi-Fi wireless communication systems may provide sub-optimal performance. For example, in a conventional Wi-Fi wireless communication system, a connection between a user equipment (UE) station and a wireless access point (WAP) is interrupted as the UE station roams among WAPs. Additionally, in a conventional Wi-Fi wireless communication system including multiple WAPs, UE stations may not be optimally distributed among the WAPs, resulting in some WAPs being overloaded and some WAPs being underutilized. Such sub-optimal UE station distribution stems from conventional Wi-Fi wireless communication systems being unmanaged, i.e. there is no system-level control of which UE stations are served by which WAP. Instead, each UE station unilaterally determines which WAP to connect to, potentially resulting in sub-optimal UE station distribution. For example, a UE station near a congested WAP may connect to the congested WAP because the congested WAP offers a highest received signal strength indication (RSSI), even though a more-distant, but uncongested, WAP would provide better service to the UE station.

Disclosed herein are systems and methods for providing continuous wireless communication service, which may at least partially overcome one or more of the above-discussed drawbacks of conventional wireless communication systems. The new systems and methods provide continuous wireless communication service during a handoff of a UE station between two wireless termination points (WTPs). Additionally, certain embodiments are configured to manage UE station connections to WTPs, such as to help optimize distribution of UE stations among WTPs. Furthermore, some embodiments do not require changes to existing UE stations, thereby promoting ease and low-cost of implementation. Moreover, particular embodiments may provide individualized wireless communication service, e.g. different respective types of wireless communication service to multiple UE stations connected to a common WTP.

Although the new systems and methods are discussed below primarily with respect to Wi-Fi wireless communication applications, the new systems and methods are not limited to Wi-Fi applications. Rather, the new systems and methods could be applied to other wireless communication systems, such as other wireless communication systems operating according to an Institute of Electrical and Electronic Engineers (IEEE) 802.11 standard, or variations, extensions, and/or successors thereof.

Figure 1:
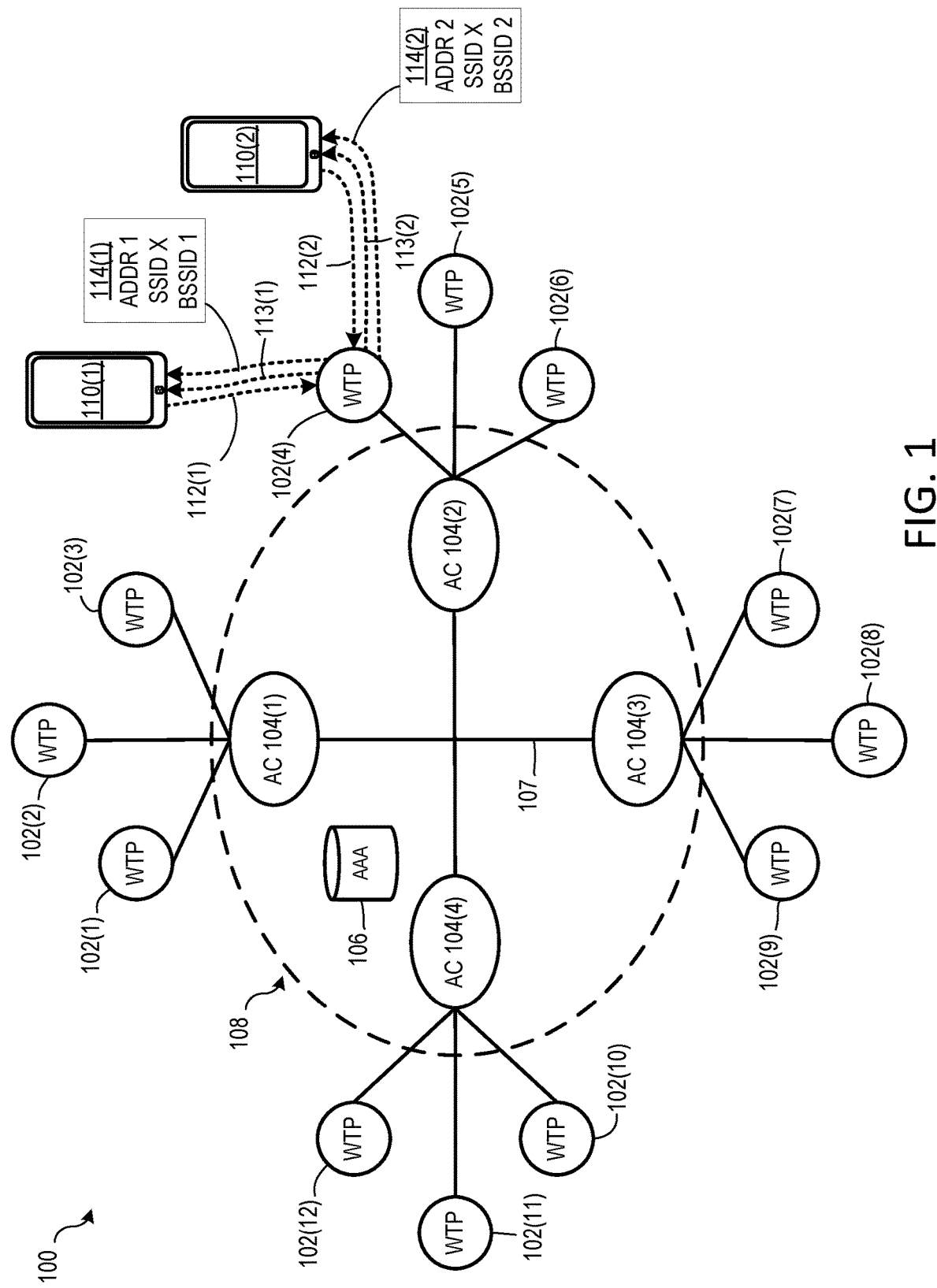
FIG. 1 is block diagram illustrating a continuous wireless communication system, according to an embodiment.

FIG. 1 is a block diagram illustrating a continuous wireless communication system 100, which is one embodiment of the new continuous wireless communication systems developed by Applicant. Wireless communication system 100 includes one or more WTPs 102, one or more access controllers (ACs) 104, and an authentication, authorization, and accounting services (AAA) server 106. ACs 104 and AAA server 106 are optionally part of a core network 108 of wireless communication system 100. ACs 104 are communicatively coupled by one or more communication buses 107. Communication buses 107 include, for example, wireline and/or wireless communication buses. Core network 108 may include additional elements without departing from the scope hereof. For example, in some embodiments, core network 108 includes one or more elements (not shown) to support encryption between UE stations 110 and core network 108, so that encryption does not need to be handled by WTPs 102. In this document, specific instances of an item may be referred to by use of a numeral in parentheses (e.g., WTP 102(1)) while numerals without parentheses refer to any such item (e.g., WTPs 102).

The number of WTPs 102 and/or ACs 104 in wireless communication system 100 may vary without departing from the scope hereof. Additionally, two or more of the elements of wireless communication system 100 could be combined without departing from the scope hereof. For example, AAA server 106 could incorporated into one or more ACs 104, and as another example, two or more ACs 104 could be combined into a single device configured to operate as two or more logically distinct ACs 104. As yet another example, one or more ACs 104 could be combined with one or more WTPs 102. Furthermore, any of the elements of FIG. 1 could include multiple sub-elements. All of the elements of wireless communication network 100 need not be owned or managed by a single party. For example, core network 108 could be managed by one party, and WTPs 102 could be managed by one or more other parties.

Each WTP 102 is configured to convert electrical or optical signals to wireless signals, and vice versa, to enable one or more UE stations 110 to wirelessly communicate with core network 108. In some embodiments, WTPs 102 operate according to a Wi-Fi-based standard or other IEEE 802.11-based standard. Although WTPs 102 are illustrated as being discrete elements, in some embodiments, two or more WTPs 102 are co-packaged. For example, in one embodiment, WTP 102(1) includes a 2.4 GHz RF transceiver and WTP 102(2) includes a 5 GHz RF transceiver, and WTPs 102(1) and 102(2) are co-packaged to yield a dual-band wireless access point, i.e. a wireless access point supporting both 2.4 GHz and 5 GHz wireless communication.

Each UE station 110 communicates with a serving WTP 102 using RF signals. For example, FIG. 1 illustrates WTP 102(4) serving UE stations 110(1) and 110(2), such that UE stations 110(1) and 110(2) communicate with WTP 102(4) via RF signals. Each UE station 110 is, for example, a mobile telephone, a computer, a set-top device, a data storage device, an Internet of Things (IoT) device, an entertainment device, a wireless access point (including, for example, eNBs, gNBs, and Wi-Fi APS acting as UEs), a computer networking device, a smartwatch, a wearable device with wireless capability, or a medical device. The number of UE stations 110 served by wireless communication system 100 may vary, and UE stations 110 are not necessarily part of wireless communication system 100. In some embodiments, UE stations 110 are conventional UE stations, i.e. UE stations 110 not specially adapted for use in wireless communication system 100.

Each AC 104 manages one or more respective WTPs 102. In the example of FIG. 1, (a) AC 104(1) manages WTPs 102(1)-102(3), (b) AC 104(2) manages WTPs 102(4)-102(6), (c) AC 104(3) manages WTPs 102(7)-102(9), and AC 104(4) manages WTPs 102(10)-102(12). However, the number and identify of WTPs 102 managed by each AC 104 may vary. In this document, an AC 104 "manages" a WTP 102 at least by controlling connection of UE stations 110 to the WTP 102. Access controllers 104 may optionally provide additional management functions, such as discussed below with respect to FIG. 7. ACs 104 communicate with each other via communication buses 107, such as to coordinate handing-off of a UE station 110 between two WTPs 102 managed by different respective ACs 104.

AAA server 106 is configured to assist ACs 104 in managing WTPs 102 by providing one or more of authentication, authorization, and accounting services to ACs 104. For example, in some embodiments, AAA server 106 authenticates and authorizes UE stations 110 connecting to wireless communication system 100, such as based on credentials received from UE stations 110 via a WTP 102 and an AC 104. For example, in some embodiments, when a WTP 102 receives a probe request 112 from a UE station 110, the WTP 102 communicates with AAA server 106 to confirm that the UE station 110 is known to wireless communication system 100, based on a media access control (MAC) address of the UE stations 110. AAA server 106 may also assist ACs 104 in authenticating wireless communication system 100 for UE stations 110. Connections between AAA server 106 and ACs 104 are not shown to promote illustrative clarity, although in some embodiments, AAA server 106 is communicatively coupled to ACs 104 via communication busses 107.

Importantly, wireless communication system 100 is configured so that WTPs 102 transmit UniCast beacons 114 to particular UE stations 110, instead of Broadcast beacons, where a "beacon" is a data structure, e.g. a data frame, including control information for use by a UE station 110. For example, FIG. 1 illustrates WTP 102(4) transmitting a UniCast beacon 114(1) to UE station 110(1), and FIG. 1 illustrates WTP 102(4) transmitting a UniCast beacon 114(2) to UE device 110(2). An AC 104 causes a WTP 102 to initiate transmission of UniCast beacons 114 to a UE station 110 in response to (1) the WTP 102 receiving a probe request 112 from the UE station 110 and (2) the AC 104 confirming that the UE station 110 is known to wireless communication system 100. A WTP 102 will also transmit a probe response 113 to a UE station 110 in response to receipt of a probe request 112 from the UE station 110.

UniCast beacon 114 is intended to be processed by one specific UE station 110, instead of by all UE stations 110 receiving the beacon. For example, UniCast beacon 114(1) is intended to be processed solely by UE station 110(1), and UniCast beacon 114(2) is intended to be processed solely by UE station 110(2). Accordingly, each UniCast beacon 114 includes an address of an intended recipient UE station 110, such as in a destination address field of the UniCast beacon. For example, UniCast beacon 114(1) includes an address ADDR 1 of UE station 110(1) in a destination address field of UniCast beacon 114(1), and UniCast beacon 114(2) includes an address ADDR 2 of UE station 110(2) in a destination address field of UniCast beacon 114(2). A Broad-Cast beacon, in contrast, does not contain an address of a specific recipient UE station in its address field. WTPs 102 transmit UniCast beacons 114, for example, under control of a respective AC 104(1) and/or local controllers (not shown) within the WTPs 102. Transmission of UniCast beacons 114, instead of Broadcast beacons, helps conserve UE station 110 resources by eliminating the need for UE stations 110 to process all received beacons. Instead, a given UE station 110 need only process UniCast beacons 114 addressed to the particular UE station 110.

Additionally, transmission of UniCast beacons 114, instead of Broadcast beacons, helps enables customization of the beacons for respective UE stations. For example, each UniCast beacon 114 includes a basic service set identifier (BSSID). Conventionally, a BSSID identifies a WTP sending a beacon, such that all beacons transmitted by a given WTP include a common BSSID associated with the WTP. In wireless communication system 100, in contrast, a respective BSSID is associated with each UE station 110. For example, unicast beacon 114(1) includes a BSSID 1 associated with UE station 110(1), and UniCast beacon 114(2) includes a BSSID 2 associated with UE station 110(2). In some embodiments of wireless communication system 100, two or more BSSIDs have different respective values. For example, in some embodiments, BSSID 1 and BSSID 2 have different respective values. However, two BSSIDs can have a common value in wireless communication system 100 without departing from the scope hereof. The fact that beacons 114 are UniCast, instead of Broadcast, enables two or more BSSIDs to have a common value while still being associated with respective UE stations 110, because each UE station 110 will only process UniCast beacons that are addressed to it. Consequently, each UE station 110 will "see" only its own BSSID.

BSSIDs may be static in that they are permanently assigned to respective UE stations 110. Alternately, BSSIDs may be dynamic in that they are assigned to respective UE stations 110 only while the UE stations are being served by wireless communication system 100. BSSIDs are associated with respective UE stations 110, for example, by AAA server 106 and/or by one or more ACs 104. In some embodiments, a BSSID associated with a respective UE station 110 is unchanged as wireless communication system 100 hands-off the UE station between WTPs 102, such as discussed below with respect to FIGS. 2-6.

Each UniCast beacon 114 further includes a service set identifier (SSID). For example, FIG. 1 illustrates each UniCast beacon 114 including a SSID. In some embodiments, all UniCast beacons 114 include a common SSID, while in some other embodiments, the SSID may vary among UniCast beacons 114. In certain embodiments, probe requests 112 are Wi-Fi-based probe requests or other IEEE 802.11-based probe requests, and UniCast beacons 114 are Wi-Fi-based beacons or other IEEE 802.11-based beacons.

In some embodiments, ACs 104 are configured to control WTPs 102 to provide different types of wireless communication service for different BSSIDs, thereby enabling wireless communication system 100 to provide individualized wireless communication service to UE stations 110. For example, in a particular embodiment, AC 104(2) is configured to associate a first and second type of wireless communication service with BSSID 1 and BSSID 2, respectively, such that WTP radio 102(4) provides first and second types of wireless communication service to UE stations 110(1) and 110(2), respectively. The first and second types of wireless communication services have at least one differing wireless service characteristic, such as quality of service (QoS), maximum communication bandwidth, priority during emergencies, access to network services, and/or roaming privileges. For example, in a particular embodiment, AC 104(2) associates BSSID 1 with a high-QoS tier and BSSID 2 with a low-QoS tier, such that UE station 110(1) receives a higher QoS than UE station 110(2). ACs 104 could be configured such that wireless communication system 100 provides more than two types of wireless communication service. It should be noted that certain embodiments of wireless communication system 100 are capable of providing individualized wireless communication service to UE stations 110 even if the UE stations operate under a common SSID, since wireless communication system 100 is capable of distinguishing UE stations 110 by their respective BSSIDs.

Figure 2:
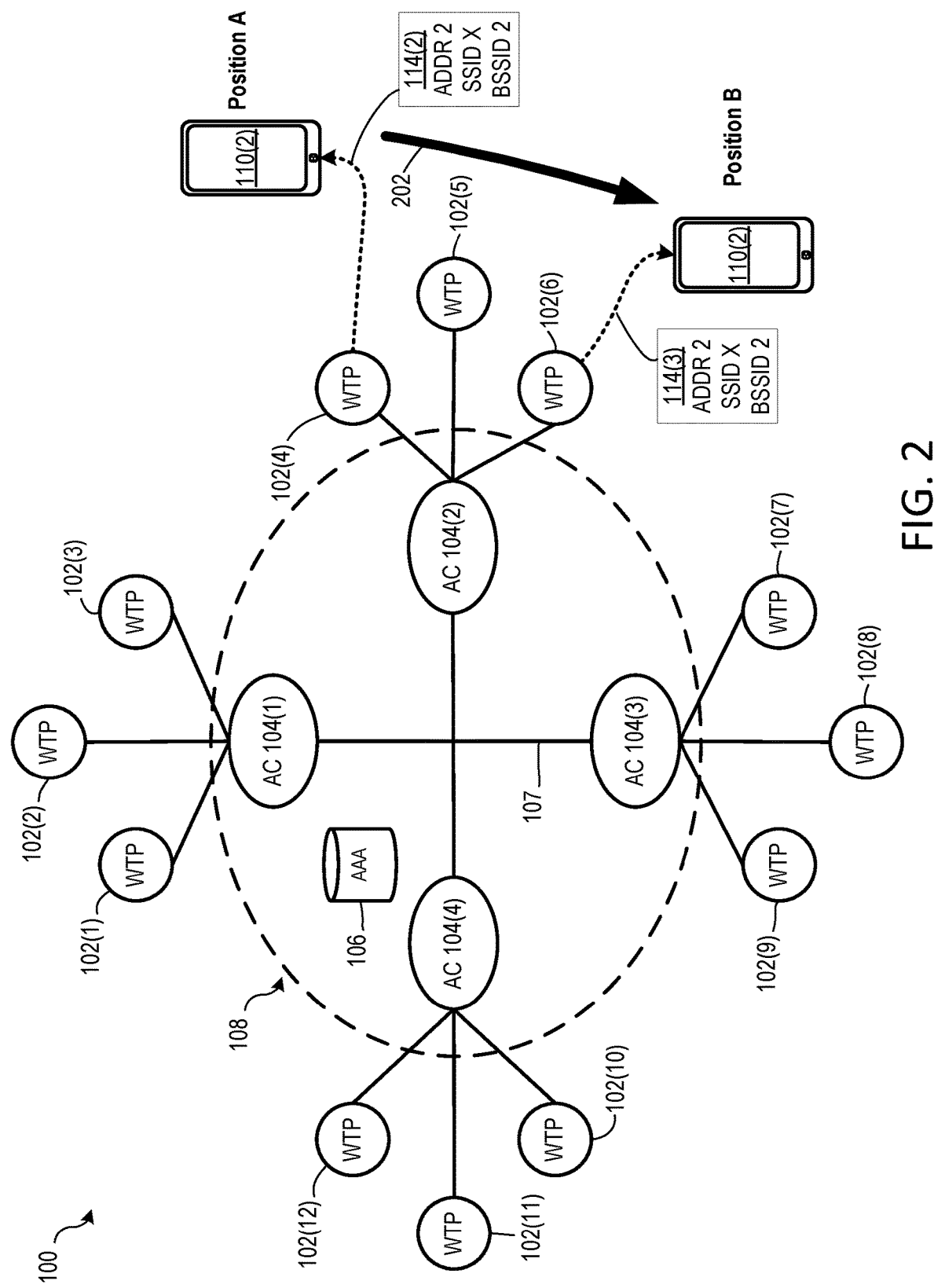
FIG. 2 is a block diagram illustrating an example of the FIG. 1 wireless communication system handing off a moving user equipment station between two wireless termination points managed by a common access controller.

In certain embodiments, wireless communication system 100 is configured to hand-off a UE station 110 from one WTP 102 to another WTP 102 in response to movement of the UE station 110, such as to maximize strength of WTP 102 RF signals received at the UE station 110. For example, FIG. 2 is a block diagram illustrating an example of wireless communication system 100 handing-off UE station 110(2) from WTP 102(4) to WTP 102(6) as UE station 110(2) moves 202 from Position A to Position B. In this example, AC 104(2) controls WTPs 102(4) and 102(6) such that (a) WTP 102(4) serves UE station 110(2) when the UE station is in Position A, and (b) WTP 102(6) serves UE station 110(2) when the UE station is in Position B.

The BSSID associated with UE station 110(2) remains unchanged as wireless communication system 100 hands-off UE station 110(2) from WTP 102(4) to WTP 102(6). Accordingly, FIG. 2 illustrates WTP 102(6) transmitting a UniCast beacon 114(3), where UniCast beacon 114(3) includes the same BSSID (BSSID 2) as UniCast beacon 114(2) transmitted by WTP 102(4). Consequentially, wireless communication system 100 appears to UE station 110(2) as having a single WTP 102 that provides continuous coverage as UE station 110(2) moves from position A to position B. Additionally, any individual wireless communication service associated with UE station 110(2) may follow UE station 110(2) during the hand-off from WTP 102(4) to WTP 102(6) because the BSSID associated with UE station 110(2) does not change during the handoff. Wireless communication system 100 may perform other hand-offs of UE stations 110 between WTPs 102 managed by a common AC 104 in a manner similar to that illustrated in FIG. 2.

FIG. 2 illustrates an example of wireless communication system 100 handing-off UE station 110(2) between two WTPs 102 served by a common AC 104. Additionally, certain embodiments of wireless communication system 100 are configured to hand-off a UE station 110 between two WTPs 102 managed by different respective ACs 104.

Figure 3:
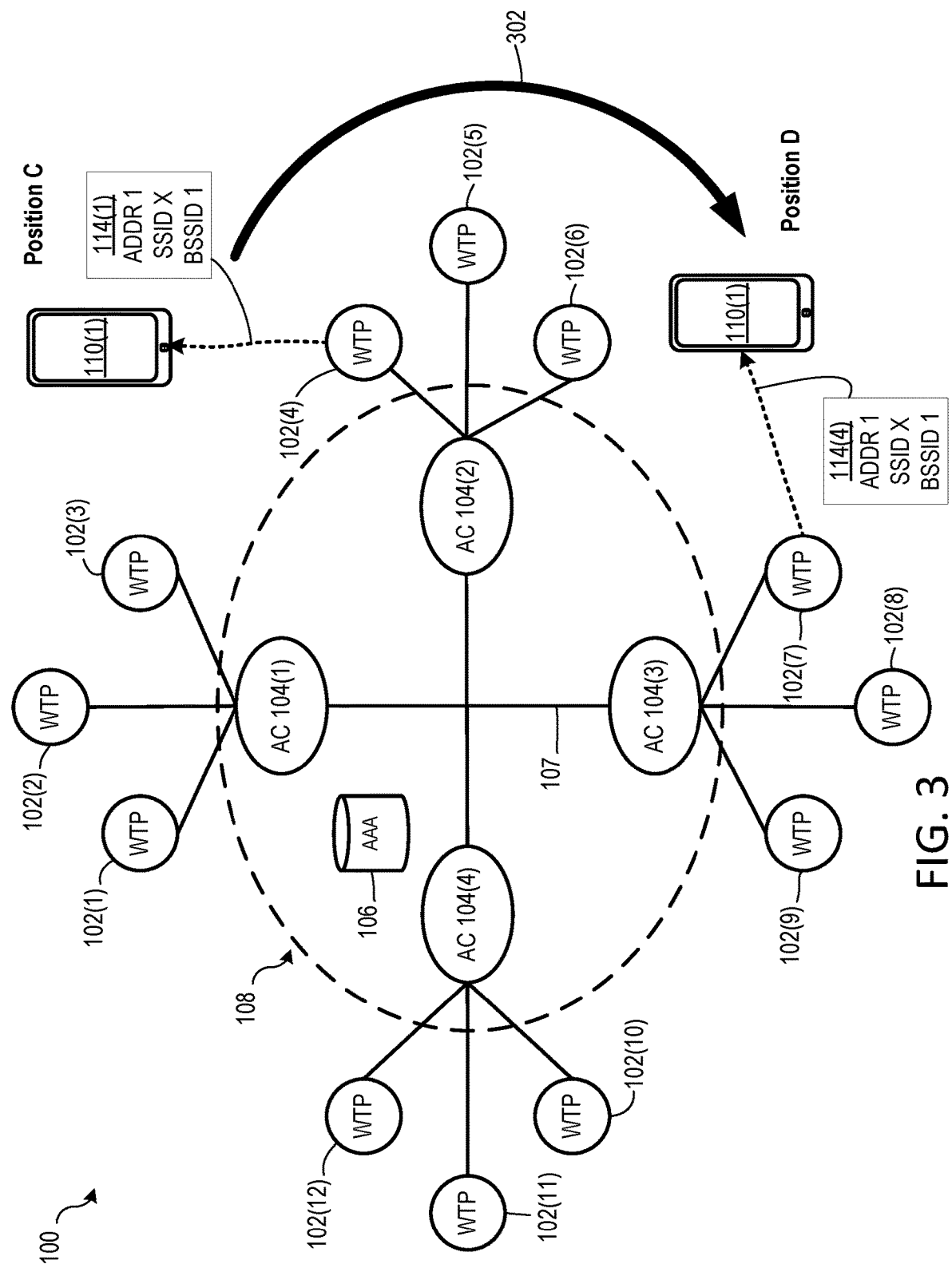
FIG. 3 is a block diagram illustrating an example of the FIG. 1 wireless communication system handing off a moving user equipment station between two wireless termination points managed by different respective access controllers.

For example, FIG. 3 is a block diagram illustrating an example of wireless communication system 100 handing-off UE station 110(1) from WTP 102(4) to WTP 102(7) as UE station 110(1) moves 302 from Position C to Position D. In this example, AC 104(2) controls WTP 102(4) and AC 104(3) controls WTP 102(7) such that (a) WTP 102(4) serves UE station 110(1) when the UE station is in Position C, and (b) WTP 102(7) serves UE station 110(1) when the UE device is in Position D. ACs 104(2) and 104(3) communicate using communication buses 107, for example, to coordinate the handoff.

The BSSID associated with UE station 110(1) remains unchanged as wireless communication system 100 hands-off UE station 110(1) between WTPs 102(4) and 102(7). Accordingly, FIG. 3 illustrates WTP 102(7) transmitting a UniCast beacon 114(4), where UniCast beacon 114(4)

includes the same BSSID (BSSID 1) as UniCast beacon 114(1) transmitted by WTP 102(4). Consequentially, wireless communication system 100 appears to UE station 110(1) as having a single WTP 102 that provides continuous coverage as UE station 110(1) moves from Position C to Position D. Additionally, any individual wireless communication service associated with UE station 110(1) may follow UE station 110(1) during the hand-off from WTP 102(4) to WTP 102(7) because the BSSID associated with UE station 110(1) does not change during the handoff. Wireless communication system 100 may perform other hand-offs of UE stations 110 between WTPs 102 managed by different ACs 104 in a manner similar to that illustrated in FIG. 3.

Additionally, certain embodiments of wireless communication system 100 are configured to handoff a UE station 110 between two WTPs 102 for reasons other than movement of the UE station. For example, some embodiments of wireless communication system 100 are configured to handoff a UE station 110 between a first and second WTPs 102 for one or more of the following reasons: (a) to relieve congestion at the first WTP 102, e.g. in response to congestion at the first WTP 102 exceeding a threshold value, (b) to relieve congestion at an AC 104 managing the first WTP 102, (c) to improve quality of wireless communication service to the UE station 110, e.g. in response to the second WTP 102 having greater capacity than the first WTP 102 and/or the second WTP 102 being better-suited for the UE station 110 than the first WTP 102, (d) in response to failure of the first WTP 102, and (e) in response to the first WTP 102 being taken off-line for maintenance. However, wireless communication system 100 may be configured to hand-off a UE station 110 between two WTPs 102 for reasons other than the above-mentioned reasons.

Figure 4:
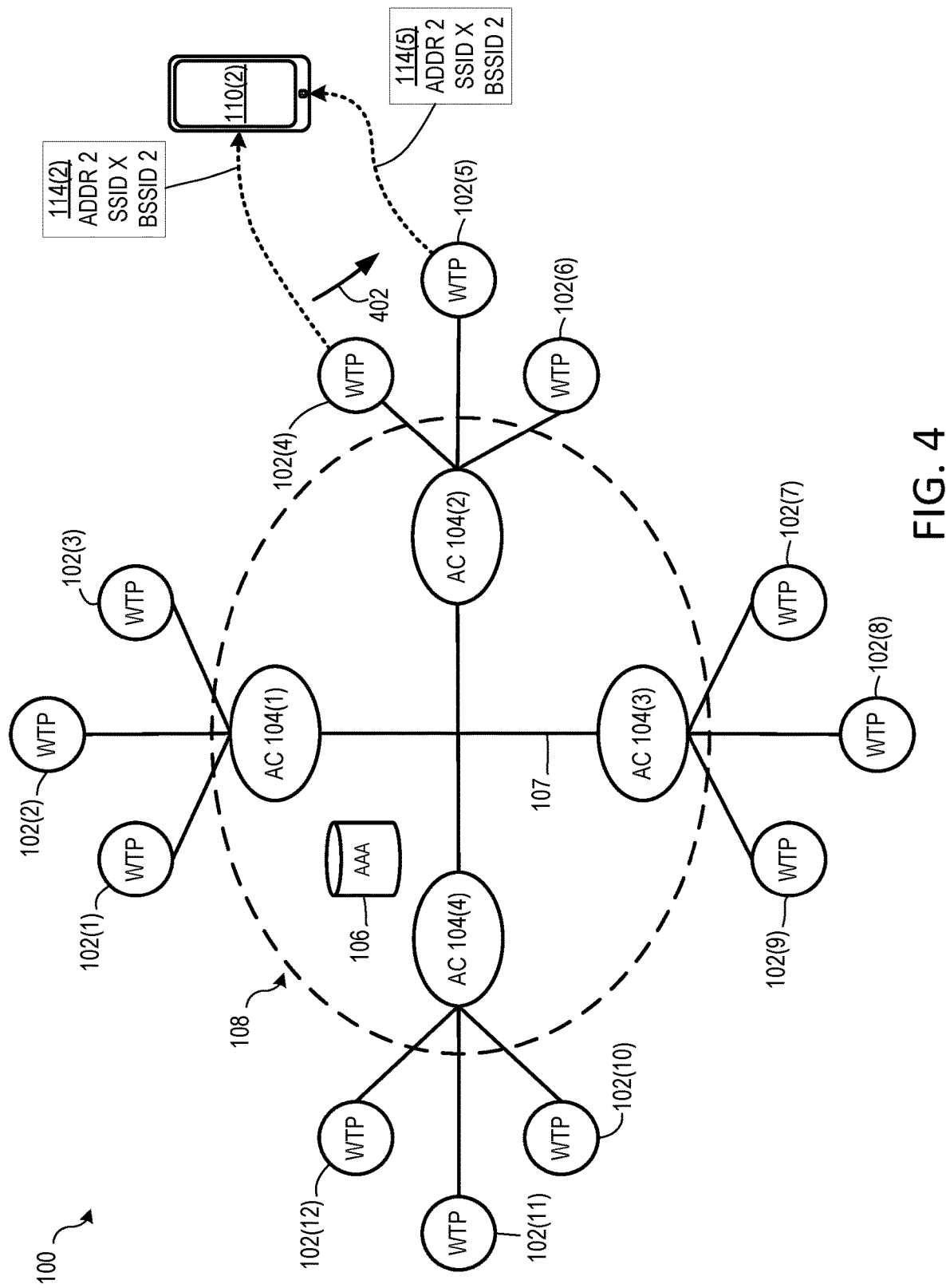
FIG. 4 is a block diagram illustrating an example of the FIG. 1 wireless communication system handing off a stationary user equipment station between two wireless termination points managed by a common access controller.
Figure 5:
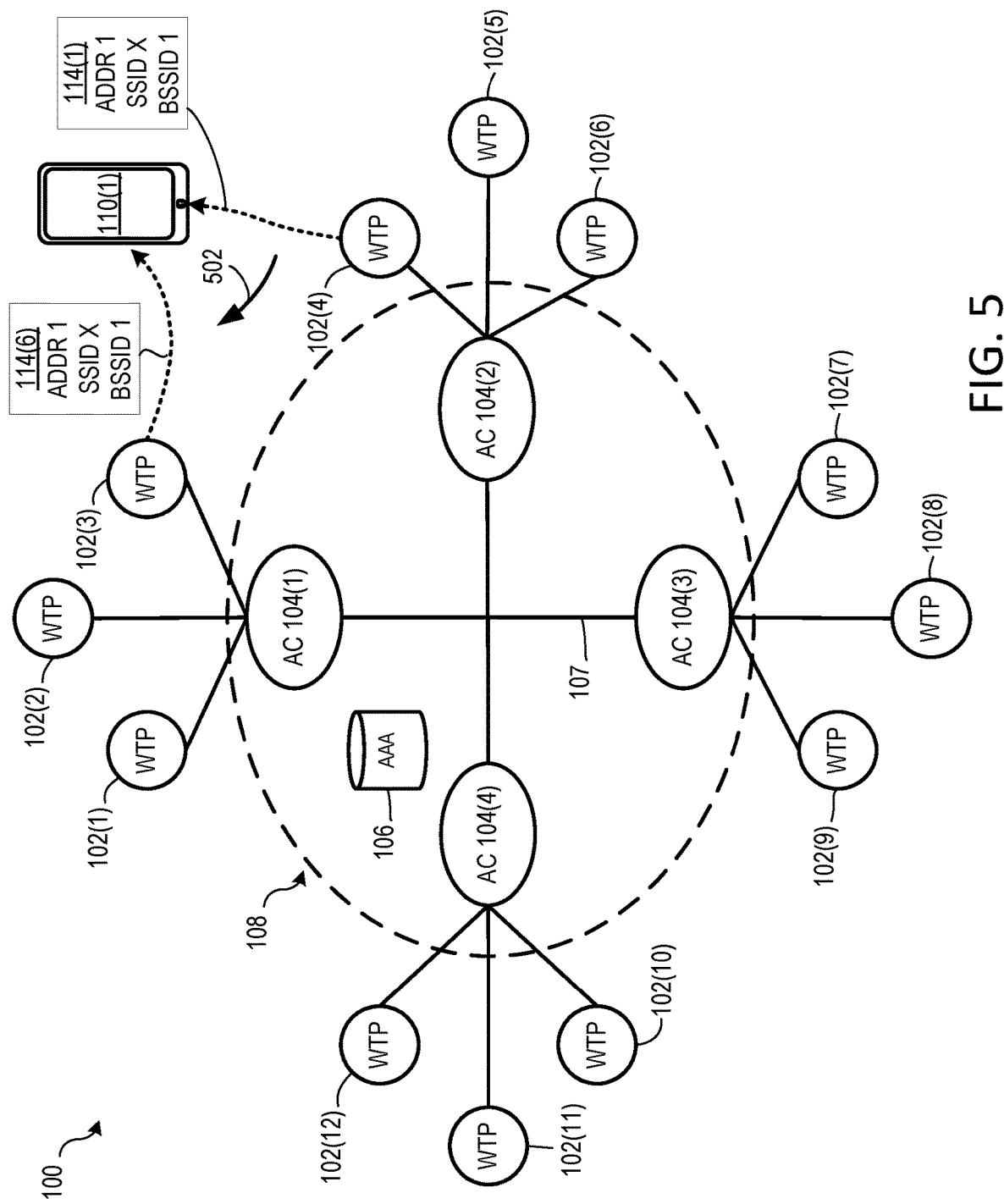
FIG. 5 is a block diagram illustrating an example of the FIG. 1 wireless communication system handing off a stationary user equipment station between two wireless termination points managed by different respective access controllers.

FIGS. 4 and 5 each illustrate an example of hand-off of a UE station 110 for a reason other than movement of the UE station. FIG. 4 is a block diagram illustrating an example of wireless communication system 100 handing-off 402 UE station 110(2) from WTP 102(4) to WTP 102(5) in response to congestion at WTP 102(4) exceeding a threshold value. The BSSID associated with UE station 110(2) remains unchanged as wireless communication system 100 hands-off UE station 110(2) between WTPs 102(4) and 102(5). Accordingly, FIG. 4 illustrates WTP 102(5) transmitting a UniCast beacon 114(5), where UniCast beacon 114(5) includes the same BSSID (BSSID 2) as UniCast beacon 114(2). Consequentially, wireless communication system 100 appears to UE station 110(2) as having a single WTP 102 that provides continuous coverage during the handoff from WTP 102(4) to WTP 102(5). Additionally, any individual wireless communication service associated with UE station 110(2) may follow UE station 110(2) during the hand-off from WTP 102(4) to WTP 102(5) because the BSSID associated with UE station 102(2) does not change during the handoff. Wireless communication system 100 may perform other hand-offs of UE stations 110 between WTPs 102 managed by a common AC 104 in a manner similar to that illustrated in FIG. 4.

FIG. 5 is a block diagram illustrating wireless communication system 100 handing-off 502 UE station 110(1) from WTP 102(4) to WTP 102(3) in response to congestion at AC 104(2) exceeding a threshold value. WTP 102(3) is managed by AC 104(1) instead of by AC 104(2), and handing-off UE station 110(1) from WTP 102(4) to WTP 102(3) will therefore relieve congestion on AC 104(2).

The BSSID associated with UE device 110(1) remains unchanged as wireless communication system 100 hands-off UE station 110(1) between WTPs 102(4) and 102(3). Accordingly, FIG. 5 illustrates WTP 102(3) transmitting a UniCast beacon 114(6), where UniCast beacon 114(6) includes the same BSSID (BSSID 1) as UniCast beacon 114(1). Consequentially, wireless communication system 100 appears to UE station 110(1) as having a single WTP 102 that provides continuous coverage during the handoff from WTP 102(4) to WTP 102(3). Additionally, any individual wireless communication service associated with UE station 110(1) may follow UE station 110(1) during the hand-off from WTP 102(4) to WTP 102(3) because the BSSID associated with UE station 110(1) does not change during the handoff. Wireless communication system 100 may perform other hand-offs of UE stations 110 between WTPs 102 managed by different respective ACs 104 in a manner similar to that illustrated in FIG. 5.

Two or more WTPs 102 may operate on different respective wireless channels, such as to avoid RF interference between the WTPs 102. Therefore, some embodiments of wireless communication system 100 are configured to include a channel switch announcement in a UniCast beacon 114 when handing off a UE station 110 between two WTPs 102 operating on different respective wireless channels. The channel switch announcement indicates to a receiving UE station 110 that a serving WTP is changing its operating wireless channel, and the UE station 110 therefore changes it operating channel in accordance with the channel switch announcement. The channel switch announcement may alternately or additionally indicate another change in wireless channel parameters, such as change in wireless channel width.

Figure 6:
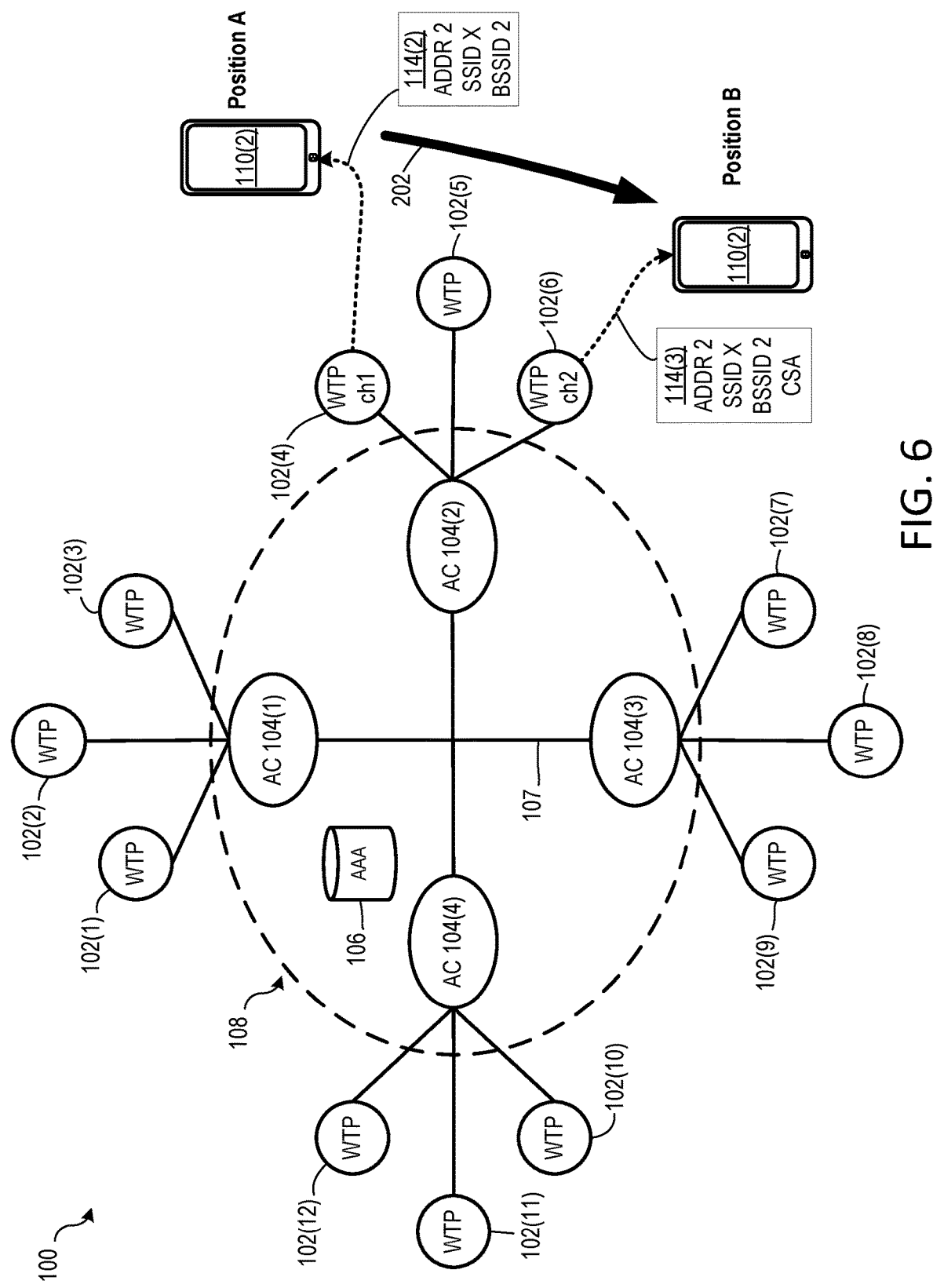
FIG. 6 is a block diagram illustrating an example of the FIG. 1 wireless communication system handing off a moving user equipment station between two wireless termination points operating on different respective wireless channels.

For example, FIG. 6 is a block diagram illustrating an example of wireless communication system 100 handing-off UE station 110(2) from WTP 102(4) to WTP 102(6), where WTP 102(4) is operating on a first wireless channel (ch1) and WTP 102(6) is operating on a second wireless channel (ch2). The FIG. 6 handoff example is similar to the FIG. 2 handoff example, except that UniCast beacon 114(3) further includes a channel switch announcement (CSA) in the FIG. 6 example. The CSA indicates to receiving UE station 110(2) that a serving WTP is changing its wireless channel to ch2, and UE station 110(2) therefore changes its operating wireless channel from ch1 to the ch2. Accordingly, including the CSA in UniCast beacon 114(3) causes UE station 110(2) to switch wireless channels in preparation for being served by WTP 102(6). Inclusion of a channel switch announcement in a UniCast beacon 114 may also prevent the receiving UE station 110 from needing to scan all possible wireless channels for an available WTP signal, thereby helping conserve resources in wireless communication system 100. The CSA may alternately or additionally indicate another change in wireless channel parameters. For example, the CSA could alternately indicate a change in channel width from 40 MHz to 80 MHz, or vice versa, thereby causing UE station 110 to switch wireless channel width in preparation for being served by WTP 102(6). Wireless communication system 100 may be configured to include a channel switch announcement in UniCast beacons 114 in other handoff scenarios, such as those discussed above with respect to FIGS. 3-5.

Figure 7:
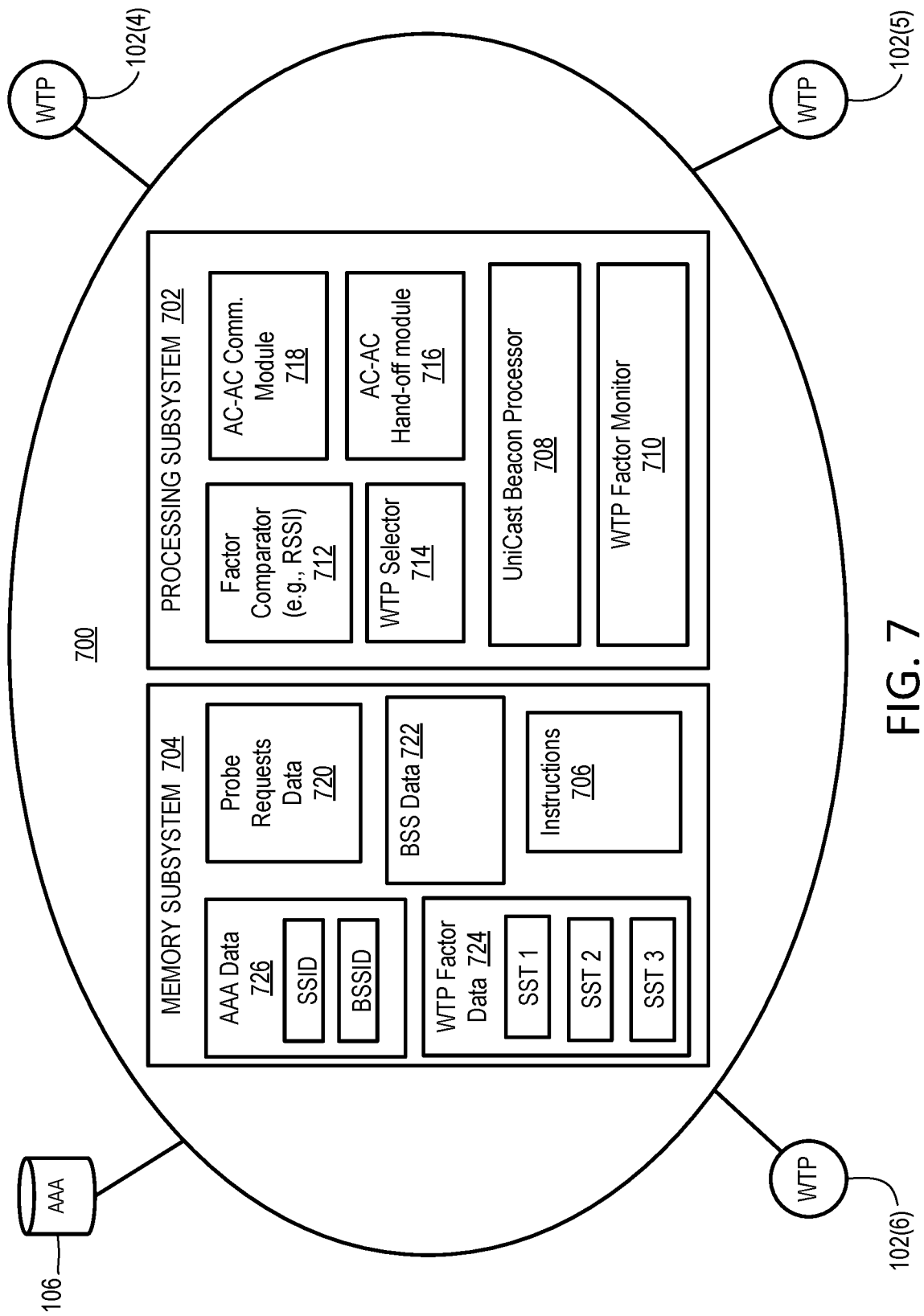
FIG. 7 is a block diagram illustrating an access controller, according to an embodiment.

FIG. 7 is a block diagram illustrating an AC 700, which is one possible embodiment of AC 104(2). ACs 104(1), 104(3), and 104(4) could each also have a configuration similar to that illustrated in FIG. 7. It should be realized, however, that ACs 104 may be implemented in other manners without departing from the scope hereof.

AC 700 includes a processing subsystem 702 and a memory subsystem 704. Processing subsystem 702 includes, for example, one or more processing devices (not shown) located at a single location or distributed among multiple locations, such as in multiple data centers. The one or more processing devices of processing subsystem 702 need not all have the same configuration. For example, processing subsystem 702 could include both microprocessors in a local server and processing resources in a cloud computing service. Memory subsystem 704 includes, for example, one or more memory devices (not shown) located at a single location or distributed among multiple locations. The one or more memory devices of memory subsystem 704 need not all have the same configuration. For example, memory subsystem 704 could include one or more solid-state memory modules and one or more magnetic data storage devices. FIG. 7 illustrates AC 700 being logically connected to each of WTP 102(4), WTP 102(5), WTP 102(6), and AAA server 106, for consistency with the examples of FIGS. 1-5. However, the elements connected to AC 700 could vary without departing from the scope hereof.

Processing subsystem 702 is configured to execute instructions 706 stored in memory subsystem 704 to control at least some functions of AC 700. Instructions 706 include, for example, software and/or firmware. In some embodiments, processing subsystem 702 executes instructions 706 to instantiate one or more of a unicast beacon processor 708, a WTP factor monitor 710, a factor comparator 712, a WTP selector 714, an AC-AC hand-off module 716, and an AC-AC communication module 718. Processing subsystem 702 could be configured to execute instructions 706 to perform one or more additional functions and/or one or more alternative functions without departing from the scope hereof.

UniCast beacon processor 708 controls WTPs 102 to generate UniCast beacons 114. AC 700 records received probe requests 112 as probe request data 720 stored in memory subsystem 704, and receipt of a probe request from a given UE station 110 is used, for example, to trigger transmission of UniCast beacons 114 to the particular UE station 110. UniCast beacon processor 708 determines which BSSID to include in a given UniCast beacon 114 from AAA data 726 stored in memory subsystem 704. AAA data 726 associates a respective BSSID with each UE station 110 served by wireless communication system 100. For example, AAA data 726 associates BSSID1 with UE device 110(1), and AAA data 726 associates BSSID 2 with UE device 110(2). As discussed above, BSSIDs may be static or dynamic. Basic service set (BSS) data 722 is also stored in memory subsystem 704.

WTP factor monitor 710 monitors one or more factors of each WTP 102 managed by AC 700, and WTP factor monitor 710 stores the monitored factors in memory subsystem 704 as WTP factor data 724. For example, FIG. 7 illustrates WTP factor data 724 including signal strength tables (SSTs) 1, 2, and 3. Each SST indicates RSSI of one or more UE stations 110 at a respective WTP 102. Specifically, SST 1 indicates RSSI of one or more UE stations 110 at WTP 102(4), SST 2 indicates RSSI of one or more UE stations 110 at WTP 102(5), and SST 3 indicates RSSI of one or more UE stations 110 at WTP 102(6). Each WTP 102 managed by AC 700 may generate and transmit its respective SST to AC 700. FIGS. 8-10 illustrate hypothetical examples of SST 1, 2, and 3, respectively. The example SST 1 of FIG. 8 indicates that the RSSI of UE stations 110(1) and 110(2) is 9 and 6, respectively, at WTP 102(4), and the example SST 2 of FIG. 9 indicates that the RSSI of UE stations 110(1) and 110(2) is 5 and 7, respectively, at WTP 102(5). The example SST 3 of FIG. 10, in turn, indicates that the RSSI of UE stations 110(1) and 110(2) is 2 and 3, respectively, at WTP 102(6).

Factor comparator 712 compares WTP factor data 724, and WTP selector 714 selects a serving WTP 102 for each UE station 110 based on the comparison performed by factor comparator 712. For example, assuming that WTP factor data 724 includes the hypothetical SSTs of FIGS. 8-10, factor comparator 712 may compare RSSI of each SST to determine that WTP 102(4) provides the highest RSSI for UE station 110(1), and WTP selector 714 may therefore select WTP 102(4) as the serving WTP for UE station 110(1). Additionally, factor comparator 712 may compare RSSI of each SST to determine that WTP 102(5) provides the highest RSSI for UE station 110(2), and WTP selector 714 may therefore select WTP 102(5) as the serving WTP for UE station 110(2). However, AC 700 is not limited to selecting serving WTPs 102 based on RSSI. Instead, AC 700 may be configured to select serving WTPs 102 based on additional or alternative factors of WTPs 102. For example, WTP factor data 724 could include one or more of the following alternative data in addition to, or in place, of SSTs 1-3: (a) congestion levels of WTPs 102, (b) capacity of WTPs 102, (c) operating status of WTPs 102, (d) capabilities of WTPs 102, and/or (e) number and/or type of UE stations 110 served by each managed WTP 102. Factor comparator 712 may be configured to compare this alternative WTP factor data 724, and WTP selector 714 may be configured to select a serving WTP based on the comparison of this alternative WTP factor data.

If WTP selector 714 selects a WTP 102 for a UE station 110 that is not the currently serving WTP for the UE station, AC 700 is configured to cause the UE station 110 to be handed-off to the selected WTP 102. For example, assume that WTP 102(4) is currently the serving WTP for UE station 110(2), and WTP selector 714 selects WTP 102(5) as the serving WTP. AC 700 would then cause UE station 110(2) to be handed-off from WTP 102(4) to WTP 102(5).

In some embodiments, AC 700 is configured to cooperate with one or more other ACs 104 to coordinate handoff of a UE station 110 from a WTP 102 managed by AC 700 to a WTP 102 managed by another AC 104. Accordingly, in some embodiments, WTP factor data 724 includes factor data for WTPs 102 other than those managed by AC 700. For example, WTP factor data 724 may include SSTs for WTPs managed by adjacent ACs 104(1) and 104(3), and in these embodiments, each WTP 102 may transmit a respective SST to adjacent ACs 104 as well as to its managing AC 104.

AC-AC hand-off module 716 and AC-AC communication module 718 facilitate handoff of a UE station 110 between WTPs 102 managed by different respective ACs 104. AC-AC communication module 718 enables AC 700 to communicate with another AC 104 to coordinate a handoff, such as to communicate output of WTP selector 714 to another AC 104. AC-AC hand-off module 716 enables AC 700 to implement a handoff of a UE device to a WTP 102 managed by another AC 104.

Referring again to FIG. 1, in some embodiments, ACs 104 are configured to support a make-before-break handoff of a UE station 110 between two WTPs 102. A make-before-break handoff is characterized by an AC 104 establishing data flow between an UE station 110 and a destination WTP 102 before terminating data flow between the UE station 110 and a source WTP 102. A make-before-break handoff advantageously prevents interruption of data flow during the handoff.

Figure 11:
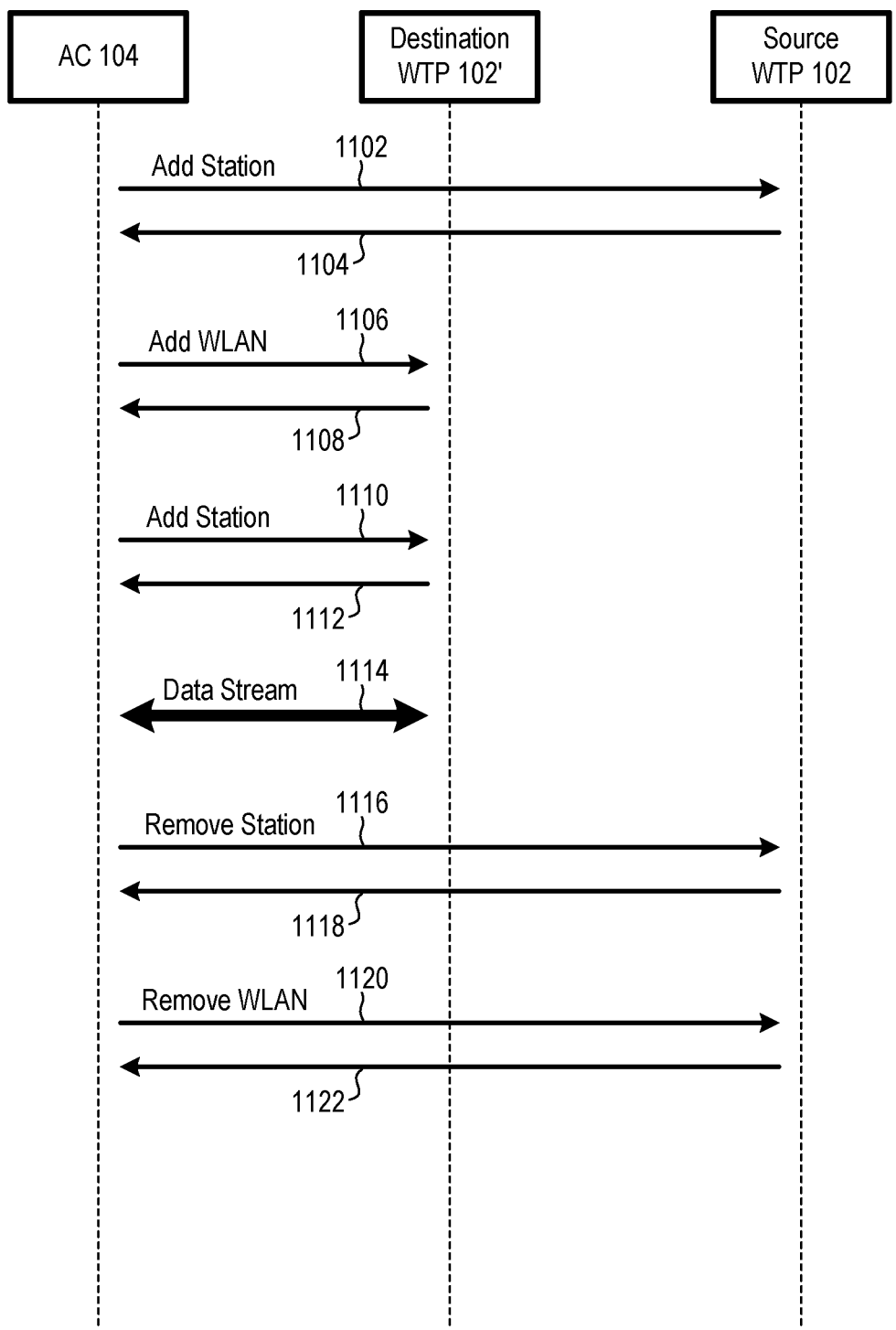
FIG. 11 is a dataflow diagram illustrating one example of a make-before-break handoff of a user equipment station in the FIG. 1 wireless communication system, according to an embodiment.

FIG. 11 is a dataflow diagram illustrating one example of a make-before-break handoff of a UE station 110 between two WTPs 102 and 102' managed by a common AC 104, in wireless communication system 100. In FIG. 11, an AC 104 supports a handoff of a UE station 110 from a source WTP 102 to a destination WTP 102'. The AC 104 optionally transmits an Add Station command 1102 to the source WTP 102, and the source WTP 102 responds with an acknowledgement 1104. The Add Station command 1102 shows the point at which the UE station 110 became associated with the source WTP 102. At a later point where the AC 104 initiates a hand-off of the UE station 110 from the source WTP 102 to the destination WTP 102', the AC 104 transmits an Add WLAN (wireless local area network) command 1106 to the destination WTP 102', and the destination WTP 102' responds with an acknowledgement 1108. After a WLAN has been added to the destination WTP 102', the AC 104 transmits an Add Station command 1110 to the destination WTP 102', and the destination WTP 102' responds with an acknowledgement 1112.

The UE station 110 is accordingly now being served by the destination WTP 102', and a data stream 1114 consequently flows between the UE station 110 and the AC 104 via the destination WTP 102'. The AC 104 waits for data stream 1114 to be established before beginning to break the connection between the source WTP 102 and the UE station 110 by transmitting a Remove Station command 1116 to the source WTP 102. The source WTP 102 responds with an acknowledgement 1118. The AC 104 optionally then transmits a Remove WLAN command 1120 to the source WTP 102, and the source WTP responds with an acknowledgement 1122. In some other embodiments, a Remove WLAN command is incorporated with Remove Station command 1116 instead of being sent as a discrete command. The make-before-break handoff is then concluded.

Both the source WTP 102 and the destination WTP 102' may simultaneously own the address of the UE station 110 during the make-before-break handoff, which may be problematic in certain circumstances. For example, both the source WTP 102 and the destination WTP 102' may respond to receipt of a data frame from the UE station 110 by transmitting an acknowledgement message, without first performing a clear-channel-assessment (CCA). Consequently, the respective acknowledgement messages from the source WTP 102 and the destination WTP 102' may collide, preventing the UE station 110 from receiving an acknowledgement message from either WTP 102.

Accordingly, in some embodiments, wireless communication system 100 is configured to reduce transmit power of the source WTP 102 during a make-before-break handoff, but only for data frames addressed to the UE station 110 being handed-off. This reduction in transmit power of the source WTP 102 helps prevent significant collisions between acknowledgement messages from the source WTP 102 and the destination WTP 102' at the UE station 110 being handed-off. Alternately or additionally, transmit power of the destination WTP 102' could be increased during the make-before-break handoff, for data frames addressed to the UE station 110 being handed off. Transmit power of the source WTP 102 and/or the destination WTP 102' during a make-before-break hand-off is controlled, for example, by one or more managing ACs 104 and/or by the source and destination WTPs themselves.

Figure 12:
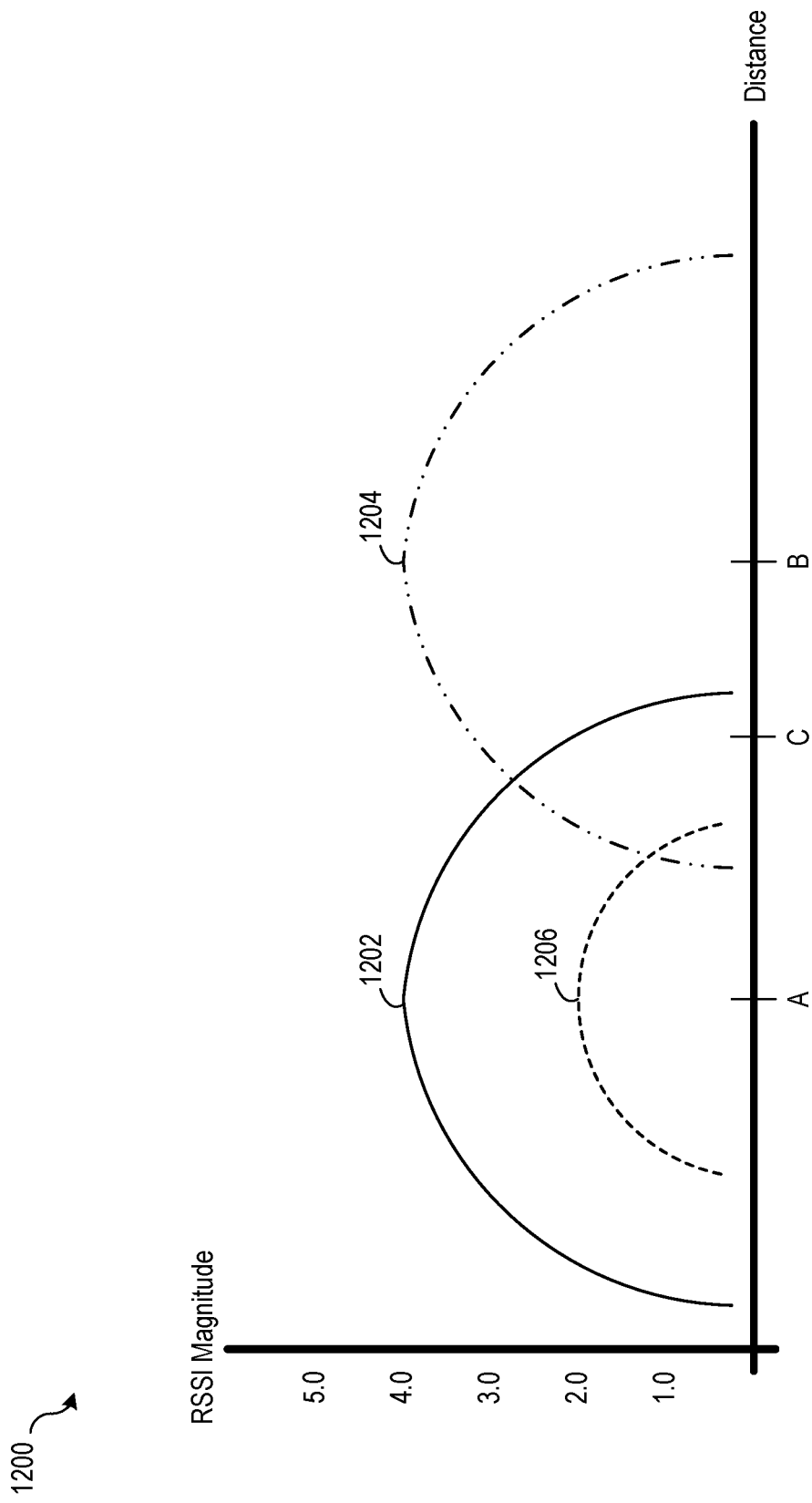
FIG. 12 is a graph illustrating one example of how a source wireless termination point may reduce transmit power during a make-before-break handoff of a user equipment station, for data frames addressed to the user equipment station, according to an embodiment.

FIG. 12 is a graph 1200 illustrating one example of how the source WTP 102 may reduce transmit power during a make-before-break handoff of a UE station 110, for data frames addressed to the UE station 110. The horizontal axis of graph 1200 represents distance, and the vertical axis of graph 1200 represents RSSI magnitude. In this example, the source WTP 102 is located at position A and has a RSSI magnitude 1202 as a function of distance from the WTP, and the destination WTP 102' is located at position B and has a RSSI magnitude 1204 as a function of distance from the WTP 102'. It should be noted that although RSSI magnitudes 1202 and 1204 are shown as monotonic curves in graph 1200 for illustrative simplicity, the actual shapes of RSSI magnitude curves may vary significantly depending on operating environment.

Assume that the UE device 110 being hand-off is located as position C. Although position C is closer to the destination WTP 102' than to the source WTP 102, RSSI 1202 of the source WTP is still relatively high at position C, i.e. about 2.0. Consequently, simultaneously transmission of acknowledgment messages by both the source and destination WTPs 102 and 102' would result in a significant RF signal collision at point C, if the source WTP 102 did not reduce it transmit power. However, in this example, the source WTP 102 reduces its transmit power during a make-before-break handoff of a UE station 110, such that data frames addressed to the UE station 110 being handed-off have an associated RSSI magnitude 1206 as a function of distance. As evident from FIG. 12, RSSI magnitude 1206 is negligible at position C, such that simultaneously transmission of acknowledgment messages by both the source and destination WTPs 102 and 102' results in negligible RF signal collision at the UE station 110 at position C.

FIGS. 13-16, discussed below, illustrate some possible operating methods of wireless communication system 100. However, wireless communication system 100 is not limited to these operating methods. Additionally, the methods of FIGS. 13-16 are not limited to use with wireless communication system 100.

FIG. 13 is a flow chart illustrating a method 1300 for providing continuous wireless communication service. In a block 1302, a first UniCast beacon is transmitted from a first WTP to a first UE station. In one example of block 1302, WTP 102(4) transmits UniCast beacon 114(2) to UE station 110(2). [FIG. 2.] In another example of block 1302, WTP 102(4) transmits UniCast beacon 114(1) to UE station 110(1). [FIG. 5]. In a block 1304, the first UE station is handed off from the first WTP to a second WTP, after transmitting the first UniCast beacon to the first UE station. In one example of block 1304, AC 104(2) controls WTPs 102(4) and 102(6) to handoff UE station 110(2) from WTP 102(4) to WTP 102(6). [FIG. 2.] In another example of block 1304, ACs 104(2) and 104(1) cooperate to control WTPs 102(4) and 102(3) to handoff UE station 110(1) from WTP 102(4) to WTP 102(3).

In a block 1306, a second UniCast beacon is transmitted from the second WTP to the first UE station, where each of the first and second UniCast beacons includes a common first BSSID. In one example of block 1306, WTP 102(6) transmits UniCast beacon 114(3) to UE station 110(2), where each of UniCast beacons 114(2) and 114(3) includes common BSSID 2. [FIG. 2.] In another example of block 1306, WTP 102(3) transmits UniCast beacon 114(6) to UE station 110(1), where each of UniCast beacons 114(1) and 114(6) includes common BSSID 1.

Figure 14:
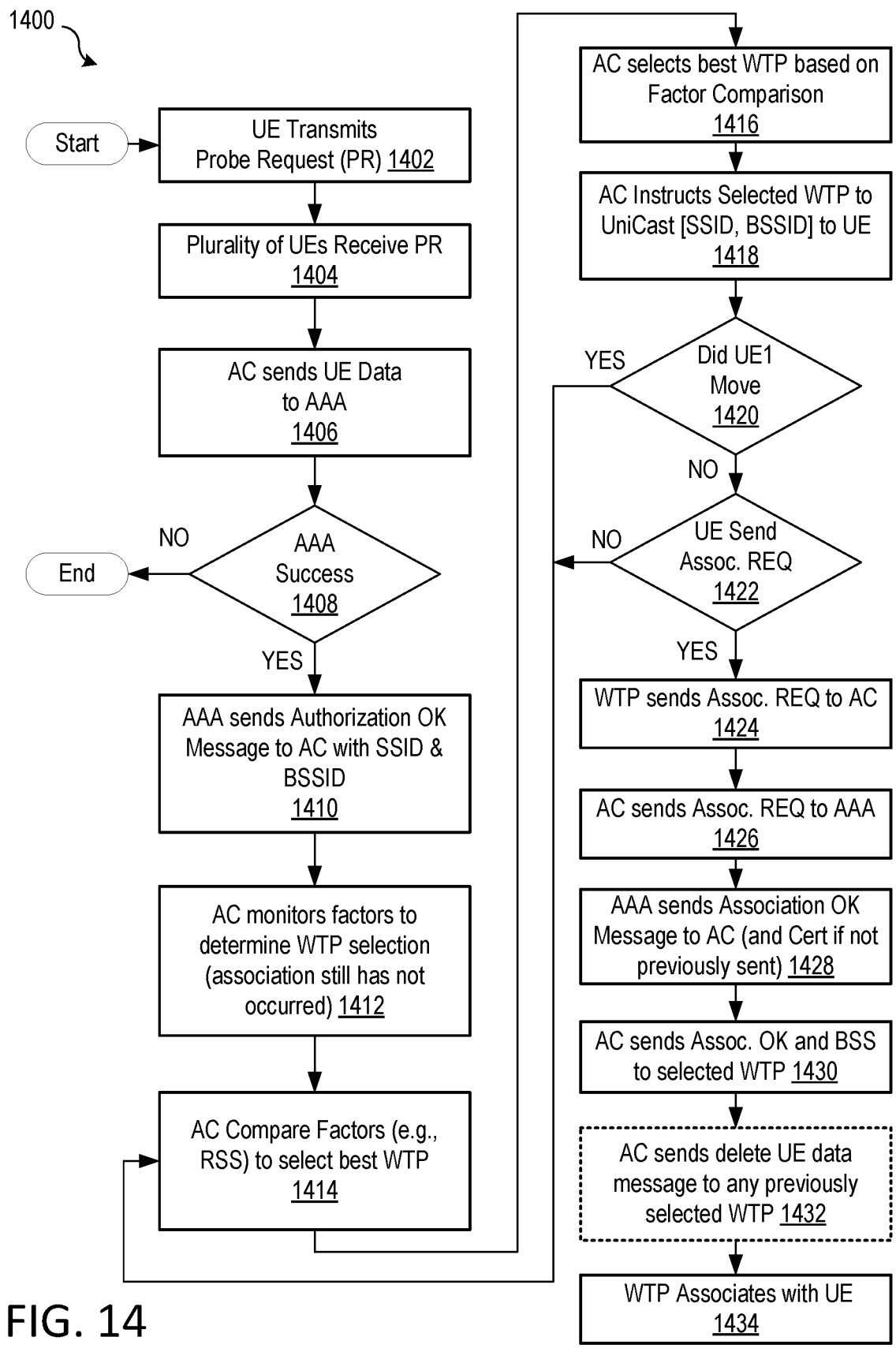
FIG. 14 is a flow chart illustrating a method for authenticating and associating a user equipment station, according an embodiment.

FIG. 14 is a flow chart illustrating a method 1400 for authenticating and associating a UE station. In a block 1402, a UE station transmits a probe request. In one example of block 1402, UE device 110(1) transmits a probe request 112(1) to WTPs 102(4) in its vicinity. [FIG. 1.] In a block 1404, a plurality of WTPs receive the probe request. In one example of block 1404, probe request 112(1) is received by each of WTPs 102(2)-102(6). In a block 1406, an AC sends UE station data, e.g. a MAC address of the UE station, to an AAA server to authenticate the UE station. In one example of block 1406, AC 104(2) sends UE station 110(1) data to AAA server 106 via an authorization message to authenticate UE station 110(1) in wireless communication system 100.

A decision block 1408 determines whether authentication is successful. If no, method 1400 ends, and if yes, method 1400 proceeds to a block 1410. In one example of decision block 1408, AAA server 106 determines whether authentication of UE station 110(1) was successful. In block 1410, the AAA server sends an authorization ok message to the AC, where the authorization ok message includes a SSID and a BSSID, in response to successful authentication of the UE device. In one example of block 1410, AAA 106 sends an authentication ok message to AC 104(2), wherein the authentication message includes a SSID and BSSID 1 associated with UE station 110(1).

In a block 1412, the AC monitors factors to determine WTP selection. In one example of block 1412, WTP factor monitor 710 monitors WTP 102 factors and stores the factors as WTP factor data 724. [FIG. 7]. In a block 1414, the AC compares WTP factors, such as RSSI data, to select a best WTP. In one example of block 1414, factor comparator 712 compares RSSI data from SSTs 1-3 stored in WTP factor data 724. In a block 1416, the AC selects the best WTP for the UE station based on the factor comparison of block 1414. In one example of block 1416, WTP selector 714 selects WTP 102(4) as being the best WTP 102 for UE station 110(1) in response to factor comparator 712 determining from SSTs 1-3 that WTP 102(4) has the highest RSSI for UE station 110(1). In a block 1418, the AC instructs the WTP selected in block 1416 to transmit UniCast beacons, including SSID and BSSID, to the UE. In one example of block 1418, AC 104(2) instructs WTP 102(4) to begin transmission of UniCast beacons 114(1) to UE station 110(1), where UniCast beacons 114(1) includes an SSID and BSSID 1.

A decision block 1420 determines whether the UE has station moved. If no, method 1400 proceeds to a decision block 1422, and if yes, method 1400 returns to block 1414 to again compare WTP factors. In one example of decision block 1420, AC 104(2) and/or WTP 102(4) determine whether UE station 110(1) has moved by determining if RSSI data for UE station 110(1) has changed by more than a threshold value, which indicates movement of UE station 110(1). A decision block 1422 determines whether the UE station has sent an association request to the WTP selected in block 1416. If no, method 1400 returns to block 1414 to again compare WTP factors, and if yes, method 1400 proceeds to a block 1424. In one example of decision block 1422, AC 104(2) determines whether it has received an association request from UE station 110(1). In block 1424, the WTP sends the association request to the AC, and in one example of block 1424, WTP 102(4) forwards an association request received from UE device 110(1) to AC 104(2). In a block 1426, the AC sends the association request to the AAA server via an authorization message, and in one example of block 1426, AC 104(2) forwards the association request received from WTP 102(4) to AAA server 106.

In a block 1428, the AAA server sends an association okay message to the AC, and the AAA server also sends a security certificate to the AC if the certificate was not previously sent. In one example of block 1428, AAA server 106 sends an association okay message to AC 104(2). In a block 1430, the AC sends the association ok message, along with basic service set (BSS) information, to the WTP selected in block 1416. In one example of block 1430, AC 104(2) forwards the association ok message received from AAA server 106, along with BSS information, to WTP 102(4). In an optional block 1432, the AC sends a delete UE data message to any previously selected WTP. In one example of block 1432, AC 104(2) transmits a delete UE message to any WTP 102 selected before WTP 102(4). In a block 1434, the WTP associates with the UE station. In one example of block 1434, WTP 102(4) associates with UE station 110(1).

Figure 15:
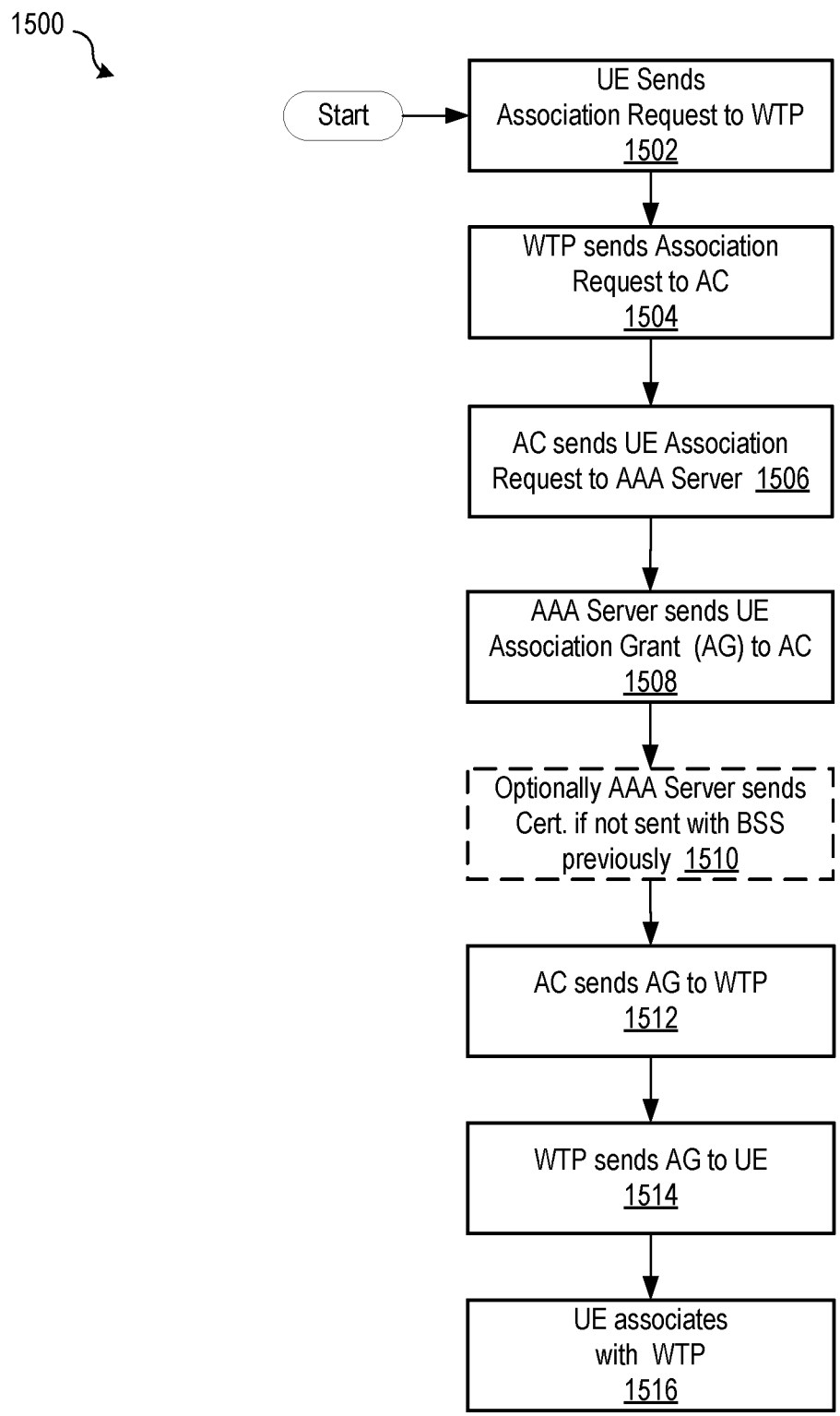
FIG. 15 is a flow chart illustrating a method for associating a user equipment station, according an embodiment.

FIG. 15 is a flow chart illustrating a method 1500 for associating a user equipment station, according an embodiment. In a block 1502, a UE station sends an association request to a WTP. In one example of block 1502, UE station 110(1) sends an association request to WTP 102(4). [FIG. 1.] In a block 1504, the WTP sends the association request to the AC. In one example of block 1504, WTP 102(4) forwards an association request received from UE station 110(1) to AC 104(2). In a block 1506, the AC sends the association request to an AAA server. In one example of block 1506, AC 104(2) forwards the association request received from WTP 102(4) to AAA server 106.

In a block 1508, the AAA server sends an association grant (AG) to the AC. In one example of block 1508, AAA server 106 sends an association grant to AC 104(2). In an optional block 1510, the AAA server optionally sends a security certificate with a BSS to the AC if the certificate was not previously sent. In one example of block 1510, AAA server 106 sends a security certificate and a BSS to AC 104(2). In a block 1512, the AC sends the association grant to the WTP. In one example of block 1512, AC 104(2) forwards the association grant received from AAA server 106 to WTP 102(4). In a block 1514, the WTP sends the association grant to the UE station. In one example of block 1514, WTP 102(4) forwards the association grant received from AC 104(2) to UE station 110(1). In a block 1516, the UE station associates with the WTP. In one example of block 1516, UE station 110(1) associates with WTP 102(4).

Figure 16:
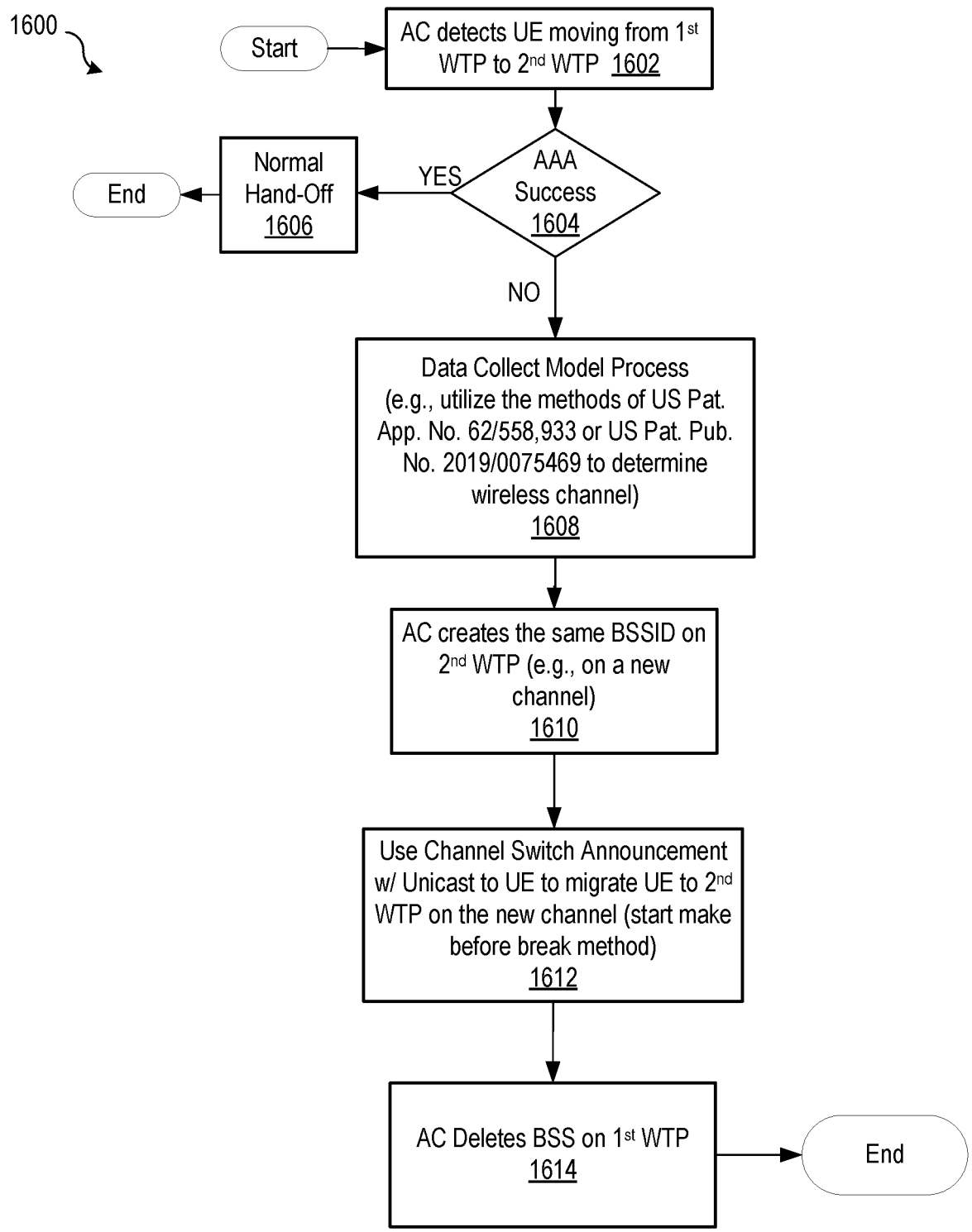
FIG. 16 is a flow chart illustrating a method for handing-off a user equipment station, according to an embodiment.

FIG. 16 is a flow chart illustrating a method 1600 for handing off a UE station. In a block 1602, an AC detects a UE station moving from a first WTP to a second WTP. In one example of block 1602, AC 104(2) detects UE station 110(2) moving from WTP 102(4) to WTP 102(6), such as illustrated in FIG. 2. In a decision block 1604, the AC determines whether authentication of the UE station at the second WTP was successful. If yes, method 1600 proceeds to a block 1606, and if no, method 1600 proceeds to a block 1608. In one example of decision block 1604, AC 104(2) determines from AAA server 106 whether authentication of UE station 110(2) at WTP 102(6) was successful. In block 1606, the UE station is handed-off from the first WTP to the second WTP using a normal procedure, e.g. without switching wireless channels used by the UE station or other wireless parameters associated with the UE station.

In block 1608, a data collection modeling process is performed, such as using techniques disclosed in one or more of U.S. Patent Application No. 62/558,933 or U.S. Patent Application Pre-Grant Publication No. 2019/0075469, to determine an optimum channel for the UE station. In one example of block 1608, AC 104(2) uses the techniques disclosed in one or more of the aforementioned U.S. patent documents to determine an optimum wireless channel for UE station 110(2). In a block 1610, the AC creates the same BSSID on the second WTP, in accordance with the channel determined in block 1608. In one example of block 1610, AC 104(2) creates BSSID 2 on WTP 102(6). In a block 1612, the second WTP uses a channel switch announcement to migrate the UE station to the channel determined in block 1608, and the AC starts a make-before-break handoff process, such as discussed above with respect to FIG. 11. In one example of block 1612, WTP 102(6) includes a channel switch announcement in a UniCast beacon 114 transmitted from WTP 102(6) to UE device 110(2), such as illustrated in FIG. 6. In a block 1614, the AC deletes the BSS on the first WTP. In one example of block 1614, AC 104(2) deletes the BSS on WTP 102(4).

Figure 17:
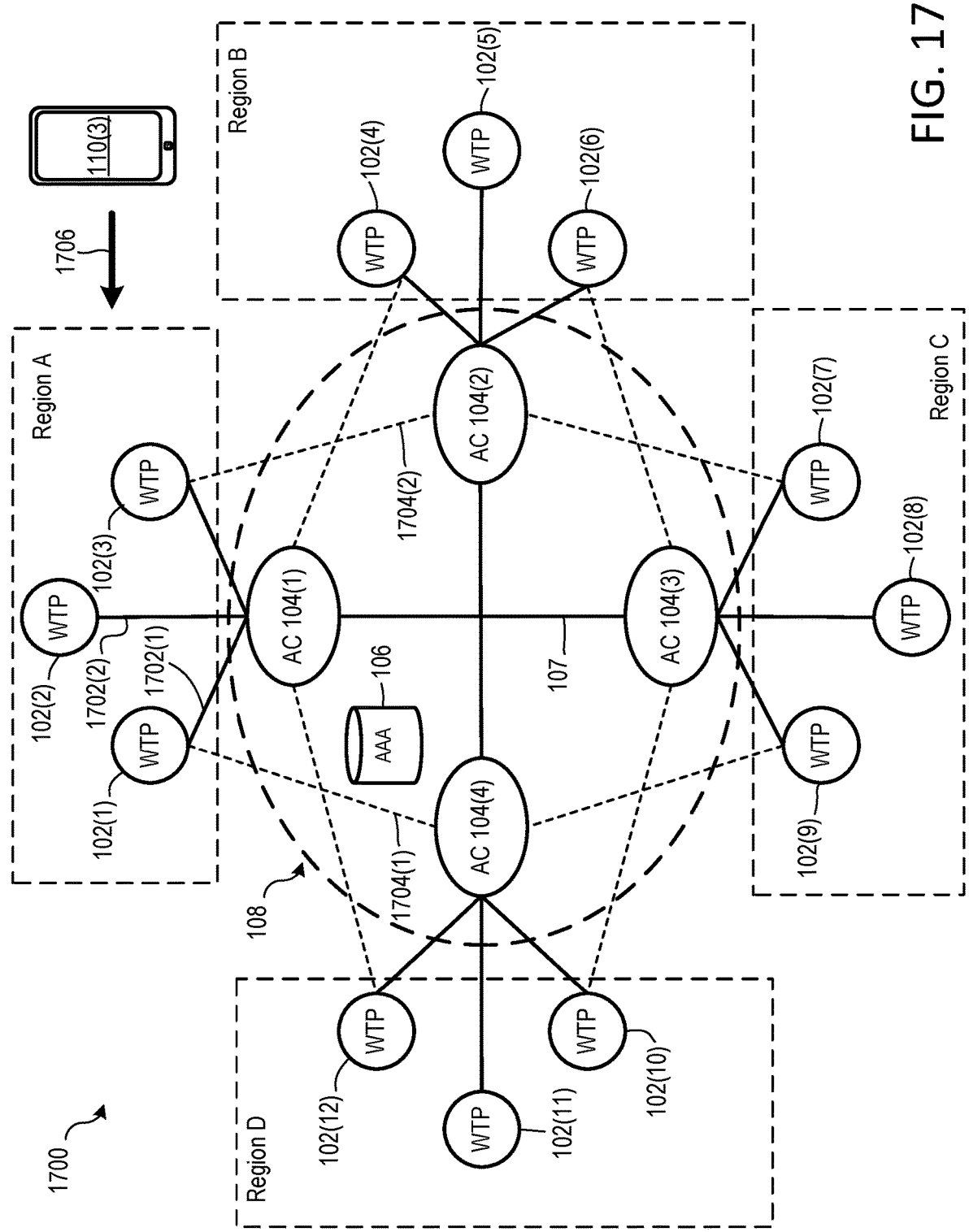
FIG. 17 is a block diagram of a wireless communication system where several wireless termination points are managed by a plurality of access controllers, according to an embodiment.

In some alternate embodiments of wireless communication system 100, at least one WTP 102 is managed by two or more ACs 104, to facilitate handoff of UE stations 110 between WTPs 102 managed by different respective ACs 104. For example, FIG. 17 is a block diagram of a wireless communication system 1700, which is an alternate embodiment of wireless communication system 100 where several WTPs 102 are managed by a plurality of ACs 104. A service area of wireless communication system 1700 is divided into four regions, namely Region A, Region B, Region C, and Region D. Region A includes WTPs 102(1)-102(3), Region B includes WTPs 102(4)-102(6), Region C includes WTPs 102(7)-102(9), and Region D includes WTPs 102(10)-102 (12). The number of regions in wireless communication system 1700, the number WTPs 102 in each region, and the identities of WTPs 102 in each region, may vary without departing from the scope hereof.

The WTPs 102 of each region are associated with a primary AC 104, and logical connections between a WTP 102 and its primary AC are denoted by a solid line 1702, only two of which are labeled in FIG. 17 to promote illustrative clarity. AC 104(1) is the primary AC for region A, AC 104(2) is the primary AC for Region B, AC 104(3) is the primary AC for region C, and AC 104(4) is the primary AC for region D. Additionally, WTPs 102 adjacent to a neighboring region are associated with a secondary AC 104, which is the primary AC 104 of the neighboring region. Logical connections between a WTP 102 and its secondary AC 104 are denoted by dashed lines 1704, only two which are labeled in FIG. 17 to promote illustrative clarity. AC 104(1) is a secondary AC to each of WTPs 102(4) and 102(12), AC 104(2) is a secondary AC to each of WTPs 102(3) and 102(7), AC 104(3) is a secondary AC to each of WTPs 102(6) and 102(10), and AC 104(4) is a secondary AC to each of WTPs 102(1) and 102(9). WTPs 102(2), 102(5), 102(8), and 102(11) are not associated with a secondary AC 104 because these WTPs are not adjacent to a neighboring region. In some alternate embodiments of wireless communication system 1700, one or more WTPs 102 are associated with two or more secondary ACs 104, such as when the WTP 102 is adjacent to two or more neighboring regions.

A primary AC 104 of a region coordinates a handoff of a UE station into the AC's region. As an example, consider an example scenario where (a) a UE station 110(3) is being served by WTP 102(4) in region B and (b) AC 104(2) is managing UE station 110(3). Now assume that UE station 110(3) is moving away from WTP 102(4) and towards WTP 102(3), as indicated by an arrow 1706. Accordingly, UE station 110(3) will be handed-off from WTP 102(4) to WTP 102(3). AC 104(1) is the primary AC associated with WTP 102(3), so AC 104(1) makes itself, instead of AC 104(2), the manager of UE station 110(3), such as using the techniques discussed below with respect to FIG. 18. AC 104(1) can make itself the manager of UE station 110(3) while the UE station is being served by WTP 102(4) because AC 104(1) is a secondary AC for WTP 102(4), as well as the primary AC for WTP 102(3). AC 104(1) then initiates and coordinates the handoff of UE station 110(3) from WTP 102(4) to WTP 102(3). In some embodiments, each WTP 102 transmits a respective SST to both the primary and secondary AC 104 associated with the WTP, to enable either of the ACs 104 to initiate a handoff of a UE station 110 served by the WTP.

It is possible that multiple WTPs 102 on multiple ACs 104 will respond to a probe request when a UE station 110 first comes online. Accordingly, in some embodiments, wireless communication system 1700 is configured so that the UE station 110 is authenticated and associated with whichever WTP 102 that is selected by the UE station 110. The UE station 110 can subsequently be handed-off to a different WTP 102, is needed.

Figure 18:
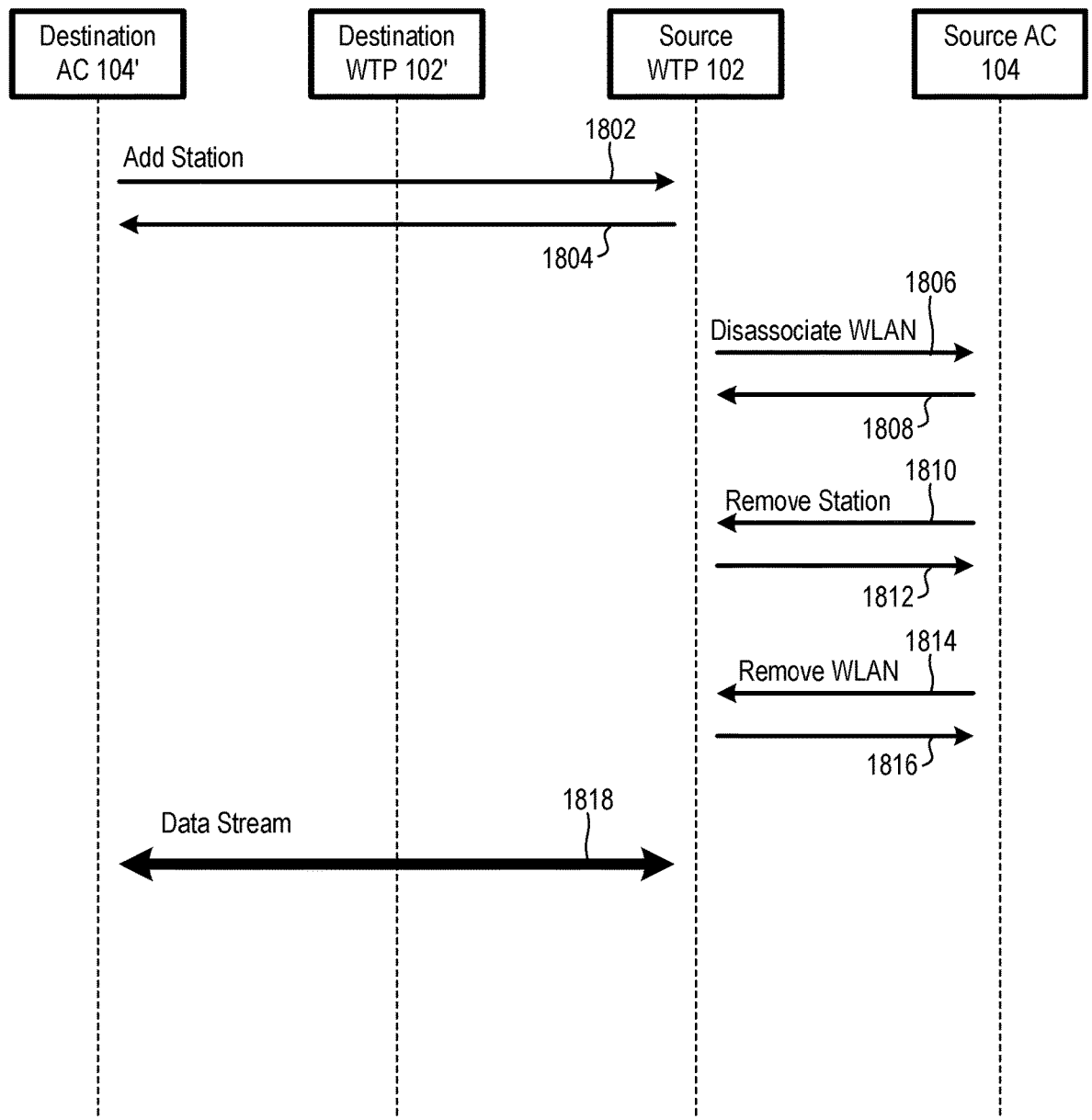
FIG. 18 is a dataflow diagram illustrating one example of transitioning access controllers during a handoff of the user equipment station, according to an embodiment.

FIG. 18 is a dataflow diagram illustrating one example of transitioning ACs 104 managing a UE station 110 during a handoff of the UE station 110. The transition begins with a destination AC 104' transmitting an Add Station command 1802 to a source WTP 102, and the source WTP 102 responds with an acknowledgement 1804. The source WTP 102 determines that the UE station 110 has already established a connection with the source AC 104, and the source WTP 102 therefore interprets the Add Station command 1802 as a request to change managing AC 104 for the UE station 110. The source WTP 102 accordingly immediately begins to transmit data to the destination AC 104', and the source WTP 102 also locks itself so that no other AC 104 can initiate a handoff. The source WTP 102 transmits a Disassociate WLAN command 1806 to the source AC 104, and the source AC 104 responds with an acknowledgement 1808. The source AC 104 responds by transmitting a Remove Station command 1810 to the source WTP 102, and the source WTP 102 responds with an acknowledgement 1812. The source AC 104 also transmits a Remove WLAN command 1814 to the source WTP 102, and the source WTP 102 responds with an acknowledgement 1816. A data stream 1818 between the source WTP 102 and destination AC 104' is established, and the destination AC 104' is now the manager of the UE station 110. The handoff continues, for example, using the techniques discussed above with respect to FIG. 11.

Although there are significant advantages to beacons 114 being UniCast beacons, as discussed above, there may be applications where it would be beneficial for beacons 114 to be MultiCast beacons, such in cases where two associated UE stations move together. Accordingly, in some alternate embodiments, beacons 114 are MultiCast beacons, instead of UniCast beacons.

Combinations of Features

Features described above may be combined in various ways without departing from the scope hereof. The following examples illustrate some possible combinations:

(A1) A method for providing continuous wireless communication service may include (1) transmitting a first UniCast beacon from a first wireless termination point (WTP) to a first user equipment (UE) station, (2) after transmitting the first UniCast beacon to the first UE station, handing off the first UE station from the first WTP to a second WTP, and (3) transmitting a second UniCast beacon from the second WTP to the first UE station, each of the first and second UniCast beacons including a common first basic service set identifier (BSSID).

(A2) The method denoted as (A1) may further include transmitting a third UniCast beacon from the first WTP to a second UE station, the third UniCast beacon including a second BSSID that is different from the first BSSID.

(A3) In any one of the methods denoted as (A1) and (A2), each of the first UniCast beacon and the second UniCast beacon may be a Wi-Fi-based beacon.

(A4) Any one of the methods denoted as (A1) through (A3) may further include handing off the first UE station from the first WTP to the second WTP at least partially in response to a signal strength of the second WTP at the first UE station.

(A5) Any one of the methods denoted as (A1) through (A4) may further include reducing a transmit power of the first WTP for data frames addressed to the first UE station, while handing off the first UE station from the first WTP to the second WTP.

(A6) Any one of the methods denoted as (A1) through (A5) may further include (1) transmitting a first signal strength table from the first WTP to a first access controller, the first signal strength table including signal strength of the one or more UE stations at the first WTP, and (2) transmitting a second signal strength table from the second WTP to the first access controller, the second signal strength table including signal strength of the one or more UE stations at the second WTP.

(A7) The method denoted as (A6) may further include handing off the first UE station from the first WTP to the second WTP at least partially in response to data contained in the first and second signal strength tables.

(A8) Any one of the methods denoted as (A6) and (A7) may further include using the first access controller to manage the first UE station.

(A9) Any one of the methods denoted as (A6) through (A8) may further include (1) transmitting the first signal strength table from the first WTP to a second access controller different from the first access controller, (2) transmitting the second signal strength table from the second WTP to the second access controller, and (3) at the second access controller, initiating serving of the first UE station by the second WTP at least partially in response to data contained in the first and second signal strength tables.

(A10) The method denoted as (A9) may further include changing a managing access controller of the first UE station from the first access controller to the second access controller, before handing off the first UE station from the first WTP to the second WTP.

(A11) Any one of the methods denoted as (A1) through (A10) may further include (1) operating the first WTP on a first wireless channel, (2) operating the second WTP on a second wireless channel different from the first wireless channel, and (3) including a channel switch announcement in the second UniCast beacon, the channel switch announcement announcing a change from the first wireless channel to the second wireless channel.

(B1) A method for providing individualized wireless communication service may include (1) transmitting a first UniCast beacon from a first wireless termination point (WTP) to a first user equipment (UE) station, and (2) transmitting a second UniCast beacon from the first WTP to a second UE station.

(B2) In the method denoted as (A1), the first UniCast beacon may include a first basic service set identifier (BSSID) associated with the first UE station, and the second UniCast beacon may include a second BSSID.

(B3) In the method denoted as (B2), the second BSSID may be different from the first BSSID.

(B4) In the method denoted as (B2), the second BSSID and the first BSSID may have a common value.

(B5) Any one of the methods denoted as (B2) through (B4) may further include associating each of the first and second BSSIDs with a common service set identifier (SSID).

(B6) Any one of the methods denoted as (B2) through (B5) may further include associating first and second types of wireless communication service with the first and second BSSIDs, respectively, the first and second types of wireless communication service having at least one differing wireless service characteristic.

(B7) In the method denoted as (B6), the at least one differing wireless service characteristic may include a differing quality of service (QoS) characteristic.

(B8) In any one of the methods denoted as (B1) through (B7), each of the first UniCast beacon and the second UniCast beacon may be a Wi-Fi-based beacon.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for providing continuous wireless communication service, the method comprising:
    transmitting a first beacon from a first wireless termination point (WTP) to at least a first user equipment (UE) station and a second UE station, the first beacon including a first identifier associated with at least each of the first UE station and the second UE station;
    after transmitting the first beacon to each of the first UE station and the second UE station, handing off each of the first UE station and the second UE station from the first WTP to a second WTP; and
    transmitting a second beacon from the second WTP to each of the first UE station and the second UE station, the second beacon including the first identifier.

2. The method of claim 1, wherein the each of the first beacon and the second beacon is a respective MultiCast beacon.

3. The method of claim 1, further comprising transmitting a third beacon from the first WTP to a third UE station, the third beacon including a second identifier that is different from the first identifier.

4. The method of claim 3, further comprising providing (a) wireless communication service having one or more first wireless service characteristics to each of the first UE station and the second UE station and (b) providing wireless communication service having one or more second wireless service characteristics to the third UE station.

5. The method of claim 4, wherein the one or more second wireless service characteristics differs from the one or more first wireless service characteristics.

6. The method of claim 4, wherein:
    the one or more first wireless service characteristics comprise a first quality of service (QoS) characteristic; and
    the one or more second wireless service characteristics comprise a second QoS characteristic that is different from the first QoS characteristic.

7. The method of claim 4, wherein:
the one or more first wireless service characteristics comprise a first communication bandwidth characteristic; and
the one or more second wireless service characteristics comprise a second communication bandwidth characteristic that is different from the first communication bandwidth characteristic.

8. The method of claim 4, wherein:
the one or more first wireless service characteristics comprise a first priority characteristic; and
the one or more second wireless service characteristics comprise a second priority characteristic that is different from the first priority characteristic.

9. The method of claim 4, wherein:
the one or more first wireless service characteristics comprise a first network access characteristic; and
the one or more second wireless service characteristics comprise a second network access characteristic that is different from the first network access characteristic.

10. The method of claim 4, wherein:
the one or more first wireless service characteristics comprise a first roaming characteristic; and
the one or more second wireless service characteristics comprise a second roaming characteristic that is different from the first roaming characteristic.

11. The method of claim 1, wherein each of the first beacon and the second beacon is a respective Wi-Fi-based beacon.

12. The method of claim 1, further comprising handing off each of the first UE station and the second UE station from the first WTP to the second WTP at least partially in response to a signal strength of the second WTP at the first UE station.

13. The method of claim 1, further comprising reducing a transmit power of the first WTP for respective data frames addressed to each of the first UE station and the second UE station, while handing off each of the first UE station and the second UE station from the first WTP to the second WTP.

14. A method for providing continuous wireless communication service, the method comprising:
transmitting a first beacon from a first wireless termination point (WTP) to a first user equipment (UE) station, the first beacon including a first basic service set identifier (BSSID) associated with the first UE station;
after transmitting the first beacon to the first UE station, handing off the first UE station from the first WTP to a second WTP; and
transmitting a second beacon from the second WTP to the first UE station, each of the first and second beacons including the first BSSID.

15. The method of claim 14, transmitting a second beacon from the first WTP to a second UE station, the second beacon including a second BSSID associated with the second UE station, the second BSSID being different from the first BSSID.

16. The method of claim 14, where the first beacon is a Wi-Fi-based beacon.

17. The method of claim 14, each of the first and second beacons being respective UniCast beacons.

18. A method for providing individualized wireless communication service, the method comprising:
transmitting a first beacon from a first wireless termination point (WTP) to a first user equipment (UE) station; and
transmitting a second beacon from the first WTP to a second UE station,
wherein:
the first beacon includes a respective first basic service set identifier (BSSID) associated with the first UE station,
the second beacon includes a respective second BSSID associated with the second UE station, and
the second BSSID is different from the first BSSID.

19. The method of claim 18, wherein each of the first beacon and the second beacon is a Wi-Fi-based beacon.

20. The method of claim 18, further comprising associating first and second types of wireless communication service with the first and second BSSIDs, respectively, the first and second types of wireless communication service having at least one differing wireless service characteristic.

* * * * *